(12) United States Patent
Bierwerth et al.

(10) Patent No.: US 11,610,474 B2
(45) Date of Patent: *Mar. 21, 2023

(54) INTEGRATED BICYCLE CONTROL DEVICE

(71) Applicant: SRAM, LLC, Chicago, IL (US)

(72) Inventors: Jochen Bierwerth, Arnstein (DE); Paul Feuerstein, Brookfield, IL (US); Ming Hsun Wu, Taichung (TW)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,604

(22) Filed: Sep. 18, 2020

(65) Prior Publication Data
US 2021/0001951 A1 Jan. 7, 2021

Related U.S. Application Data

(63) Continuation of application No. 16/433,144, filed on Jun. 6, 2019, now Pat. No. 10,807,675, which is a
(Continued)

(51) Int. Cl.
G08C 17/02 (2006.01)
B62K 23/02 (2006.01)
B62K 21/12 (2006.01)
B62J 50/21 (2020.01)
B62J 43/30 (2020.01)
H01Q 1/32 (2006.01)
B62J 45/00 (2020.01)
B62J 11/00 (2020.01)

(52) U.S. Cl.
CPC ............. G08C 17/02 (2013.01); B62J 43/30 (2020.02); B62J 50/21 (2020.02); B62K 21/125 (2013.01); B62K 23/02 (2013.01); B62J 11/00 (2013.01); B62J 45/00 (2020.02); G08C 2201/10 (2013.01); H01Q 1/32 (2013.01)

(58) Field of Classification Search
CPC ...... G08C 17/02; G08C 2201/10; B62J 50/21; B62J 43/30; B62J 45/00; B62J 11/00; B62K 21/125; B62K 23/02; H01Q 1/32
See application file for complete search history.

(56) References Cited

U.S. PATENT DOCUMENTS 5,201,442 A * 4/1993 Bakalian .................. A45F 3/16
222/626
7,132,931 B2 11/2006 Okada
(Continued)

FOREIGN PATENT DOCUMENTS

TW 241699 2/1995
TW 577429 U 2/2004
(Continued)

Primary Examiner — Thomas D Alunkal

(57) ABSTRACT

An integrated bicycle control device has a handlebar portion of a bicycle handlebar assembly. The handlebar portion has a body with a gripping portion adjacent a distal end of the body and a transition portion spaced from the gripping portion. A compartment may be formed in the transition portion and an opening in the body may permit access to the compartment. An actuator is disposed near the distal end of the gripping portion. A control element and/or other elements or circuitry may be disposed within the compartment. The control device may include integrated accessory attachment structure.

15 Claims, 27 Drawing Sheets

Related U.S. Application Data continuation-in-part of application No. 16/010,086, filed on Jun. 15, 2018, now Pat. No. 10,513,311.

(56) References Cited

U.S. PATENT DOCUMENTS

| | | | |
|---|---|---|---|
| 7,995,787 B2 * | 8/2011 | Ierfone | G10K 9/22 |
| | | | 340/432 |
| 9,821,884 B2 | 11/2017 | Katsura et al. | |
| 9,858,807 B2 | 1/2018 | Hamlin et al. | |
| 10,513,311 B1 * | 12/2019 | Bierwerth | B62M 25/08 |
| 10,807,675 B2 * | 10/2020 | Bierwerth | B62J 43/30 |
| 2003/0022743 A1 | 1/2003 | Meggiolan | |
| 2003/0140727 A1 | 7/2003 | Chuang | |
| 2005/0178235 A1 | 8/2005 | Okada | |
| 2006/0090589 A1 | 5/2006 | Ording et al. | |
| 2010/0059638 A1 | 3/2010 | Taiga | |
| 2010/0194187 A1 * | 8/2010 | Howard | B62K 9/00 |
| | | | 340/432 |
| 2014/0157944 A1 | 6/2014 | Galstad | |
| 2016/0176468 A1 | 6/2016 | Poole et al. | |
| 2016/0311499 A1 * | 10/2016 | Kasai | B62M 25/04 |
| 2016/0347415 A1 | 12/2016 | Katsura et al. | |
| 2016/0364982 A1 | 12/2016 | Hamlin et al. | |
| 2017/0050701 A1 | 2/2017 | Feuerstein et al. | |
| 2017/0080993 A1 | 3/2017 | Bierwerth et al. | |
| 2017/0369125 A1 | 12/2017 | Katsura | |

FOREIGN PATENT DOCUMENTS

| | | |
|---|---|---|
| TW | I248413 B | 2/2006 |
| TW | M396792 U | 1/2011 |
| TW | M438435 U | 10/2012 |
| TW | I620682 B | 4/2018 |
| WO | 2016034957 | 3/2016 |
| WO | 2017188824 | 11/2017 |

* cited by examiner

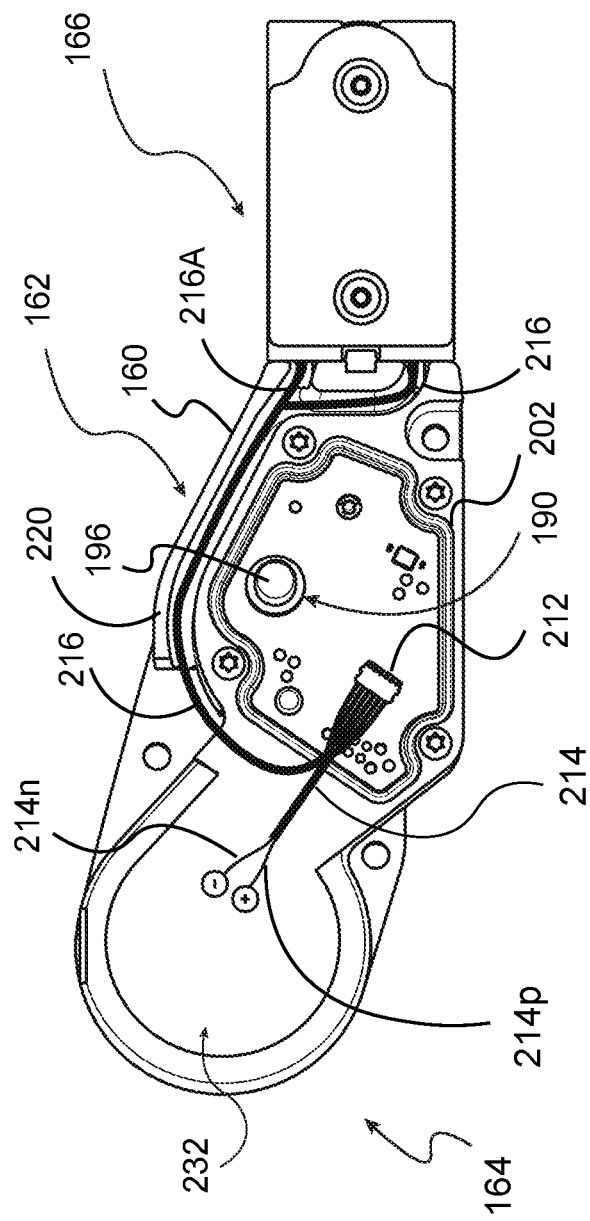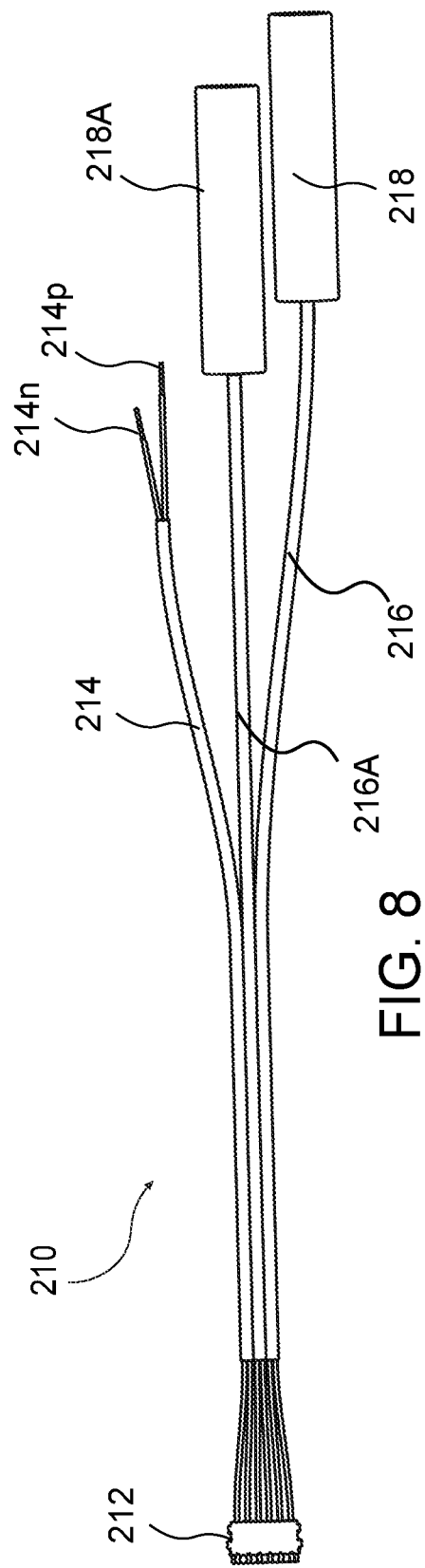
FIG. 7
FIG. 8

INTEGRATED BICYCLE CONTROL DEVICE

This application is a continuation of U.S. patent application Ser. No. 16/433,144, filed Jun. 6, 2019, which is a continuation-in-part of U.S. patent application Ser. No. 16/010,086, filed Jun. 15, 2018, now U.S. Pat. No. 10,513,311, the contents of which are herein included by reference in their entirety.

BACKGROUND

Field of the Disclosure

The present disclosure is generally directed to control of bicycle components, and more particularly to remote actuation via a wireless system integrated as part of a bicycle handlebar component.

Description of Related Art

Remote actuation of bicycle components using control devices is generally known in the art. Existing bicycle control devices of this type are designed to be inserted into the ends of bicycle handlebars. These devices provide either a wired signal or a wireless signal to operate a bicycle component located elsewhere on the bicycle. These devices are designed to fit in the free end of a bicycle handlebar. Such devices are thus entirely contained within a gripping portion of the handlebar.

One problem with such devices is that the rider's hands may interfere with the wireless signal generated and/or received by the control device. This is because the antenna is located as part of the control device within the gripping portion of the handlebar. The rider's hands wrap around the gripping portion of the handlebar and thus can interfere with the wireless signals. In some of these devices, the user input for the control device is a part of the junction box of the device. In some of these devices, the user input may be separate from the junction box, which requires external connection wires. In these devices with a separate use user input, the junction box is still within the gripping portion and the antenna is located proximate to the gripping portion at the handlebar end.

Additional or other devices and/or accessories may be convenient for a rider if located in a space occupied by bicycle handlebars. Existing attachment and/or integration techniques may be unreliable, inconvenient, or ineffective for some bicycle applications, such as time trial or triathlon type applications.

U.S. Pat. No. 9,821,884 discloses one such control device or bicycle operating device that is configured to be press fit into a free end of one of the handlebars. The operating device controls a bicycle component via the transmission of wired or wireless signals. The operating device is located entirely within the gripping portion of the handlebar.

U.S. Publication No. 2017/0080993 discloses a bicycle control device specifically for wirelessly controlling a bicycle component. The bicycle control device is again arranged in a handlebar of the bicycle. The antenna is attached to the operator control, which is located outside of the handlebar, but which is also located at the gripping element of the handle bar.

U.S. Pat. No. 9,858,807 discloses a wireless control system for controlling an external device. The control system is inserted into an end of the handlebar. The entire control system is located within the gripping portion of the handlebar, including the antenna. The user input device is located away from the free end of the bar, but external wires are required to connect the user input to the junction box.

The external wires used to connect the user input devices to the junction boxes of these types of devices can create problems and disadvantages for the rider and during assembly of the bicycle. The wires can complicate the assembly process or become damaged or disconnected, rendering the control device, and thus the bicycle component, inoperative during use.

SUMMARY

In one example, according to the teachings of the present disclosure, an integrated bicycle control device includes a handlebar portion of a bicycle handlebar assembly. The handlebar part has a body with a gripping portion adjacent a distal end of the body and a transition portion spaced from the gripping portion. A compartment is formed in the transition portion and an opening in the body permits access to the compartment. An actuator is disposed at or near the distal end of the gripping portion. A control element is disposed within the compartment. The control element includes a housing and a controller in the housing. The controller is configured to generate a signal in response to actuation of the actuator.

In one example, the handlebar part can include a mounting portion adjacent a proximal end of the body. The transition portion can be disposed between the mounting portion and the gripping portion.

In one example, the handlebar part can be bent between a mounting portion and the gripping portion, where the transition portion is between the mounting and gripping portions.

In one example, the transition portion can have a cross section shape that is different from a cross section shape of the gripping portion, a mounting portion, or both.

In one example, the gripping portion can have an interior with a maximum width or diameter that is smaller than a maximum width or diameter of the compartment within the transition portion.

In one example, the control element can have a size that is too large to fit within an interior of the gripping portion but not too large to fit within the compartment within the transition portion.

In one example, the opening into the body can be disposed on a top of the body.

In one example, the opening into the body can be disposed on a side of the body.

In one example, the handlebar part can be a bar extension having a mounting portion adjacent a proximal end of the body. The bar extension can be configured to extend forward on a bicycle when the mounting portion is connected to the bicycle.

In one example, the bicycle control device can include a removable cover attachable to the body to cover the opening and close the compartment. The removable cover and the opening can be positioned on a side of the body.

In one example, a portion of the transition section can be transparent to radio frequency transmission signals. For example the portion may be formed of a material operable to allow the passage of radio frequency signals, such as a plastic or other material.

In one example, a radio frequency transparent portion can be transparent to radio frequency transmission signals and can be a removable cover attachable to the body to cover the opening and close the compartment.

In one example, the body can be made from a carbon fiber material and the cover can be made from a material other than a carbon fiber material.

In one example, the integrated bicycle control device can include a battery or power supply case coupled to the housing. The power supply case can be configured to contain a battery for providing power to the controller. A removable cover can close off the power supply case.

In one example, the integrated bicycle control device can include a battery for providing power to the control element. The battery can be positioned remote from the control element.

In one example, the integrated bicycle control device can include a wireless communication device, for example an antenna and/or other associated circuitry, that can be in communication with the controller.

In one example, the antenna can be positioned along the transition portion of the handlebar part.

In one example, the gripping portion can be adjacent a distal end of the body.

In one example, the actuator can be connected by a cable to the control element.

In one example according to the teachings of the present disclosure, a handlebar part of a bicycle handlebar assembly includes a body having a gripping portion and a transition portion spaced from the gripping portion. A compartment is formed in the transition portion and an opening is in the body to permit access to the compartment. A removable cover is attachable to the body to cover the opening and close the compartment. A control device is integrated into the body. The control device has an actuator coupled to the handlebar part adjacent the gripping portion. A control element is received within the compartment and includes a controller configured to generate a signal in response to actuation of the actuator and a communication module configured to transmit the signal. The control device also includes an antenna and a power supply for providing power to the controller and the communication module.

In one example, the handlebar part can include an LED in the control element. The LED can be visible from outside the handlebar part.

In one example, the handlebar part can be a bar extension configured to be connected to a handlebar assembly.

In one example, the body can have a mounting portion adjacent a proximal end of the body. The transition portion can be disposed between the mounting portion and the gripping portion.

In one example, the opening can be on a top of the body.

In one example, the opening can be on a side of the body.

In one example, the antenna can be provided as a part of the control element.

In one example, the power supply can be provided as a part of the control element.

In one example according to the teachings of the present disclosure, an integrated bicycle control device includes a handlebar part of a bicycle handlebar assembly. The handlebar part has a body with a gripping portion adjacent a distal end of the body, a mounting portion adjacent a proximal end of the body, and a transition portion spaced from and disposed between the gripping portion and the mounting portion. A compartment is formed in the body and an opening in the body permits access to the compartment. An actuator is disposed at or near the distal end of the gripping portion. A control element is received in the compartment and includes a housing and a controller in the housing configured to generate a signal in response to actuation of the actuator. An antenna is in communication with the controller and is positioned along the body spaced from the distal end and the gripping portion. The actuator is connected to the control element.

In one example, the antenna can be disposed along the transition portion of the body.

In one example, the compartment can be in the transition portion.

In one example, the antenna can be in the housing of the control element.

In one example, an integrated bicycle control device is provided. The device includes a handlebar part of a bicycle handlebar assembly. The handlebar part has a body with a gripping portion adjacent a distal end of the body and has a transition portion spaced from the gripping portion. The body comprises an actuator disposed at or near the distal end of the body. The transition portion includes accessory attachment structure, and a control element. The control element includes a controller configured to generate a signal in response to actuation of the actuator.

BRIEF DESCRIPTION OF THE DRAWINGS

Objects, features, and advantages of the present disclosure will become apparent upon reading the following description in conjunction with the drawing figures, in which:

FIG. 7 shows a side view of the control element of FIG. 5A and with a cover panel removed.

FIG. 8 shows a view of wiring and connectors for connecting the control element to an actuator of an integrated bicycle control device, such as that shown in FIGS. 3 and 4, and according to the present disclosure.

DETAILED DESCRIPTION OF THE DISCLOSURE

Figure 1:
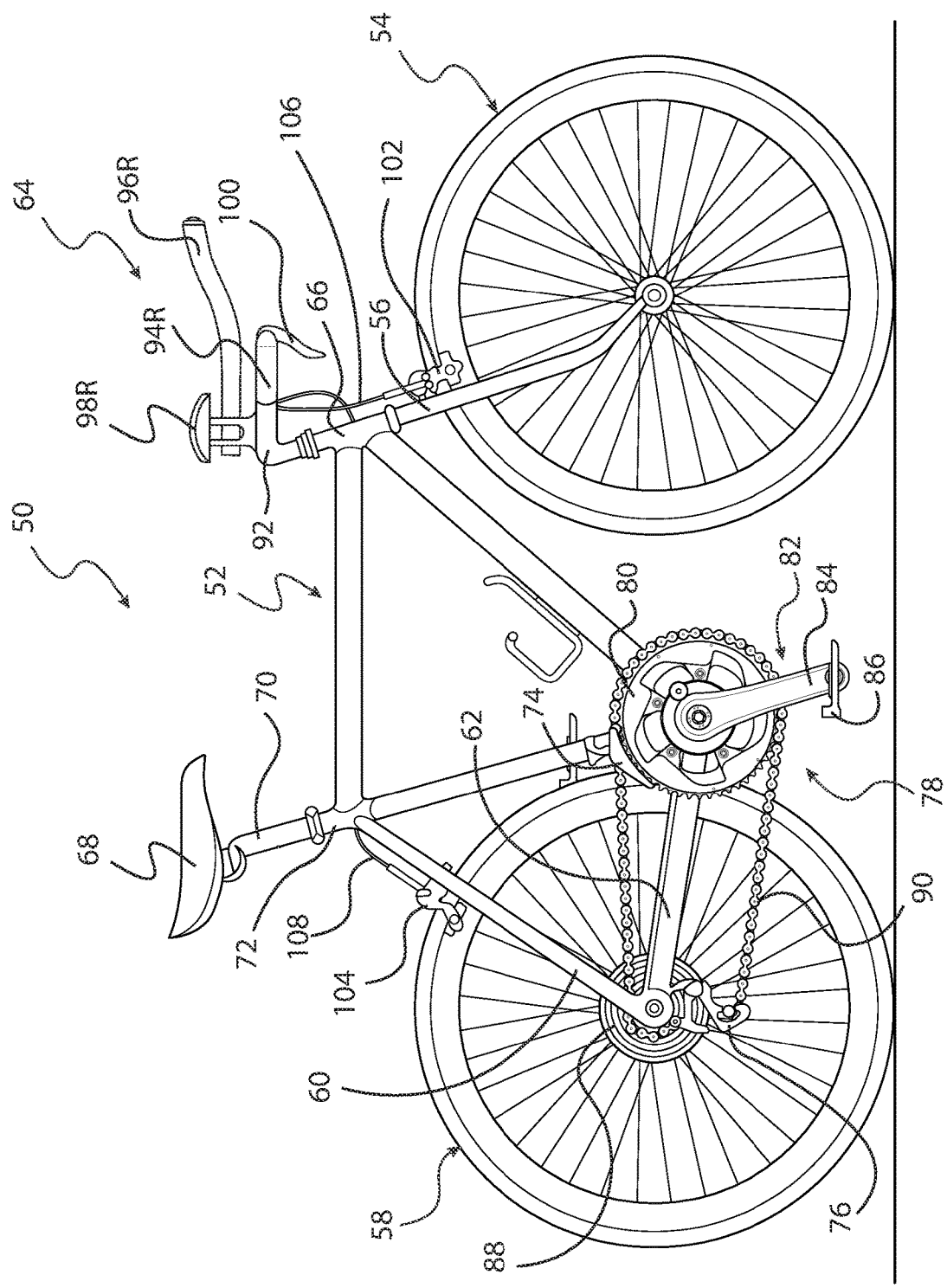
FIG. 1 shows a side view of one example of a bicycle including an integrated bicycle control device according to the present disclosure.

An integrated bicycle control device is disclosed herein that solves or improves upon one or more of the above-mentioned and/or other problems and disadvantages with prior known control devices. The disclosed integrated bicycle control device includes a control element and an actuator mounted to and integrated with a handlebar or a handlebar extension of a bicycle. The integrated bicycle control device is mounted to a handlebar or handlebar extension of a bicycle with the control element, including an antenna, in a position that is spaced from a rider gripping portion of the handlebar or extension. The actuator is mounted at or adjacent the gripping portion of the handlebar or handlebar extension. The bicycle can include two of the integrated bicycle control devices, one mounted to each handlebar or handlebar extension. The integrated bicycle control device may be configured as a part of or to control an electronic shift system to wirelessly transmit and/or receive shift signals with an electronic shift component of the bicycle. The integrated bicycle control device has a power supply unit and can have one or more inputs or jacks for connecting to remote actuators located elsewhere on the bicycle.

The disclosed integrated bicycle control device may position a wireless communicator part, such as an antenna, at a different location from the gripping portion within a handlebar or handlebar extension so that a rider's hand does not interfere with the wireless signals. Further, in an embodiment, the disclosed integrated bicycle control device may include auxiliary ports or jacks to connect additional, remote actuators, i.e., user input devices (buttons, levers, etc.) to the device through auxiliary cables. Thus, a remote actuator can be used to operate the integrated bicycle control device.

The disclosed integrated bicycle control device may be configured to include a user input (for example, an actuator) and a control element that are integrated within a handlebar extension for a time trial (TT) or triathlon (TRI) bicycle. However, the disclosed integrated bicycle control device can be utilized and integrated with a handlebar or handlebar extension on other types of bicycles as well. The disclosed integrated bicycle control device includes a user input or actuator, such as a button, located at a free end of a handlebar or handlebar extension. The actuator or user input is connected to a control element in a transition portion of the handlebar or handlebar extension, spaced from a gripping portion. The control element can include at least one antenna, a power source, and auxiliary connectors to connect to remotely placed user input devices, other input devices, actuators, or the like.

The disclosed integrated bicycle control device may also be configured to include a bicycle accessory attachment structure for convenient integration of additional or alternative bicycle devices or accessories.

The integrated nature of the disclosed control device makes the device easier to assemble because a user does not need to deal with routing and attaching cables or with mounting the actuator or control element. Further, all the components and any wires are located inside the handlebar or handlebar extension. Thus, the disclosed integrated bicycle control device can provide a clean look and aerodynamic benefits. Additionally, because the disclosed integrated bicycle control device is a fully integrated system within a handlebar or handlebar extension, there is an added benefit of not having to design an actuator to fit inside or on an end of different handlebars or handlebar extensions with various geometries.

Various examples of integrated bicycle control devices are disclosed and described herein. The disclosure is not limited to only those specific examples and component combinations and arrangements. Features of each of the disclosed examples may be used alone or in combination with any one or more features of the other integrated bicycle control device examples and in other combinations thereof.

Those having ordinary skill in the art should understand that the drawings and detailed description provided herein are for illustration only and do not limit the scope of the invention or the disclosure. The appended claims define the scope of the invention and the disclosure. The terms "first", "second," and the like, as well as "front", "rear," "left", "right", and the like are used for the sake of clarity. Such terms and similar terms are not used herein as terms of limitation. Further, such terms refer to bicycle mechanisms that are conventionally mounted to a bicycle and with the bicycle oriented and used in a standard manner, unless otherwise indicated.

Turning now to the drawings, FIG. 1 depicts a bicycle 50 with a frame 52, a front wheel 54 coupled to a fork 56 of the frame, and a rear wheel 58 coupled to seat stays 60 and chain stays 62 of the frame. The wheels 54, 58 support the frame 52 above a surface on which the bicycle 50 can travel in a forward direction indicated by the arrow 'A'. The bicycle 50 has a handlebar assembly 64, described further below, that is mounted to a head tube 66 of the frame 52. The bicycle 50 also has a seat 68 carried by a seat post 70 received in a seat tube 72 of the frame 52. The bicycle 50 may have one or both of a front gear changer 74 and a rear gear changer 76 mounted to the frame 52. The gear changers 74, 76 may be electromechanical derailleurs, for example. The bicycle 50 includes a multiple-geared drive train 78 with one or more chainrings 80 driven by a crank assembly 82, which has two crank arms 84 and two pedals, respectively 86. The chainrings 80 may be connected to a plurality of sprockets 88 at the rear wheel 58 by a chain 90. The bicycle 50 as described above is known in the art.

Figure 2:
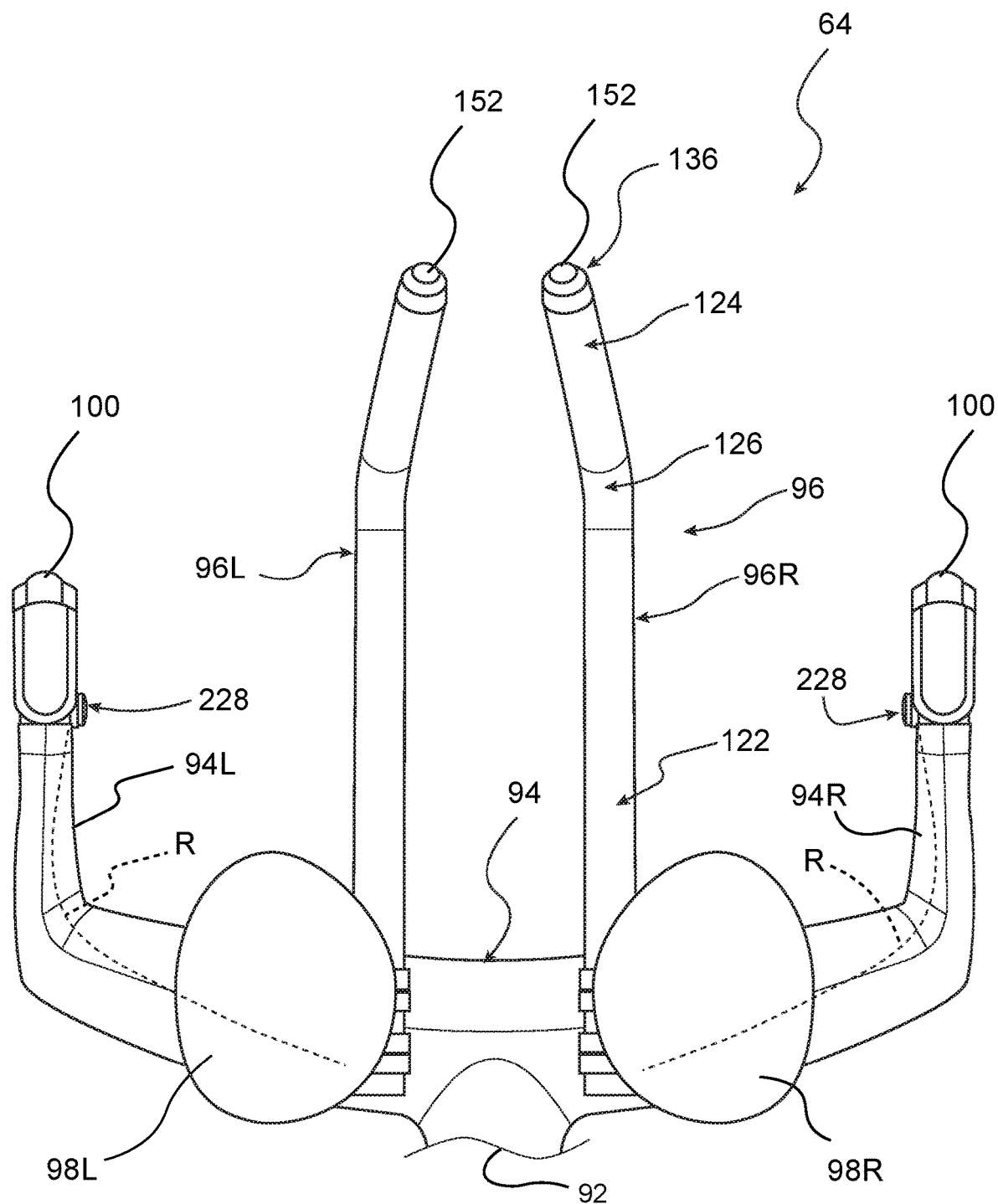
FIG. 2 shows a top view of the handlebars and handlebar extensions of the bicycle of FIG. 1.

In the disclosed example, the handlebar assembly 64, as shown in FIGS. 1 and 2, is a TT or TRI type handlebar arrangement. The handlebar assembly 64 thus has a stem 92 coupling the assembly to the head tube 66 and a pursuit bar 94 coupled to the stem and having left-hand and right-hand bar segments 94L and 94R. The handlebar assembly 64 in this example also has a pair of aero bars or handlebar extensions, hereinafter identified as bar extensions 96 (when referred to herein generally), including a left-hand bar extension 96L and a right-hand bar extension 96R (when referred to herein specifically). The bar extensions 96 are mounted to and project forward from the pursuit bar 94 in this example. The handlebar assembly 64 also has a pair of elbow or forearm cradles 98 (when referred to herein generally), i.e., elbow or forearm supports, including a left-hand support 98L and a right-hand support 98R (when referred to herein specifically). The cradles 98 are also mounted to the pursuit bar 94 in this example and the bar extensions 96 may be mounted directly to the cradles 98 and thus indirectly to the pursuit bar 94.

In this example, the bicycle 50 includes a brake system. The brake system includes a brake lever 100 that is movably connected to a forward end of each of the pursuit bar segments 94L, 94R, though only one is shown in FIG. 1. The brake levers 100 operate components of the braking system of the bicycle 50. In one example, the brake system can include one or both of a hydraulic or cable actuated front brake mechanism 102 coupled to the front wheel 54 via a hydraulic line or mechanical cable 106 and a hydraulic or cable actuated rear brake mechanism 104 coupled to the rear wheel 58 through a hydraulic line or mechanical cable 108. As noted above, the brake system can be a hydraulic actuated system or a mechanical actuated system and both are known in the art.

Figure 3:
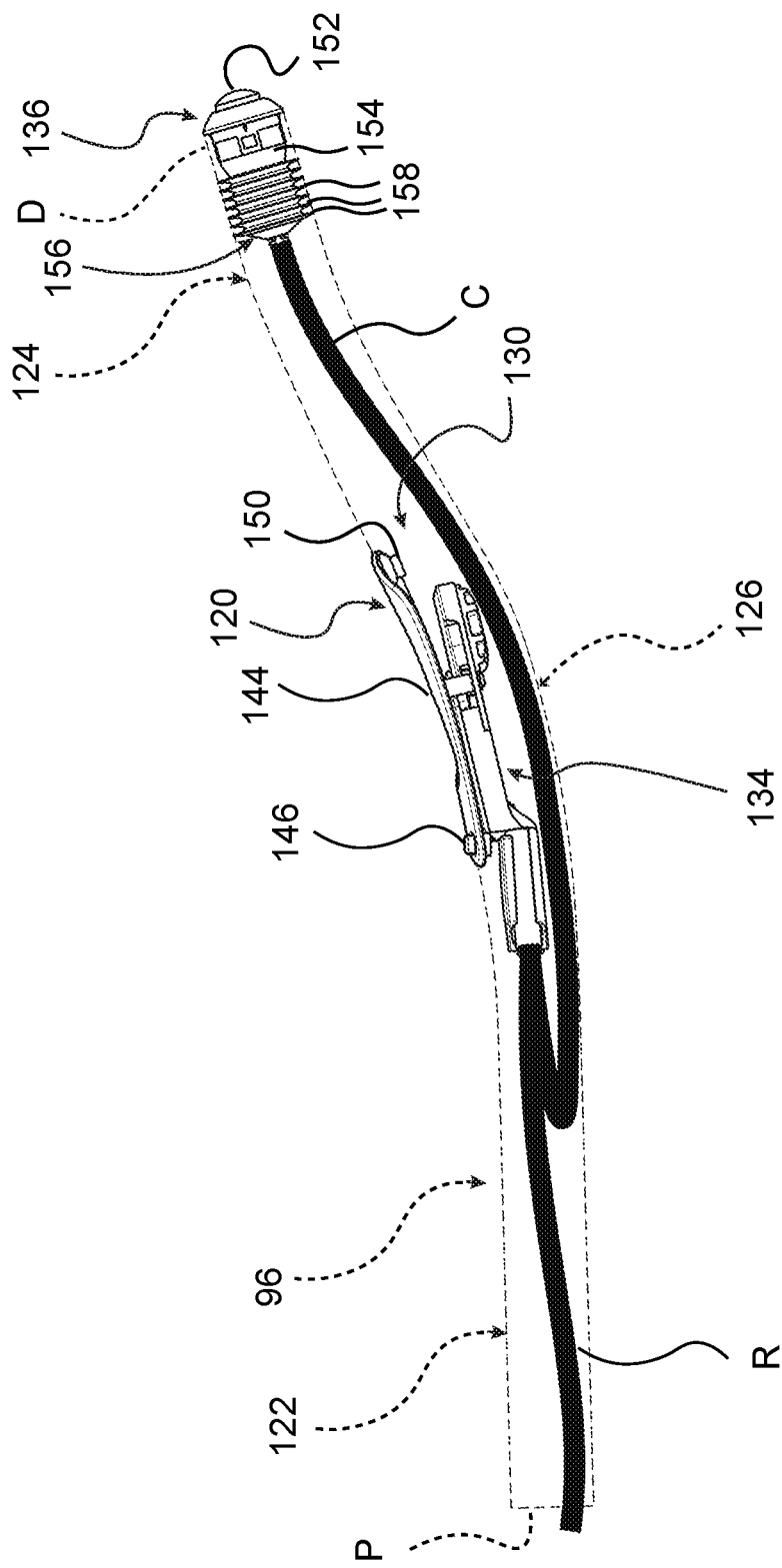
FIG. 3 shows a side view of one handlebar extension, shown in phantom, such as the handlebar extensions shown in FIGS. 1 and 2, and depicts one example of an integrated bicycle control device according to the present disclosure.
Figure 4:
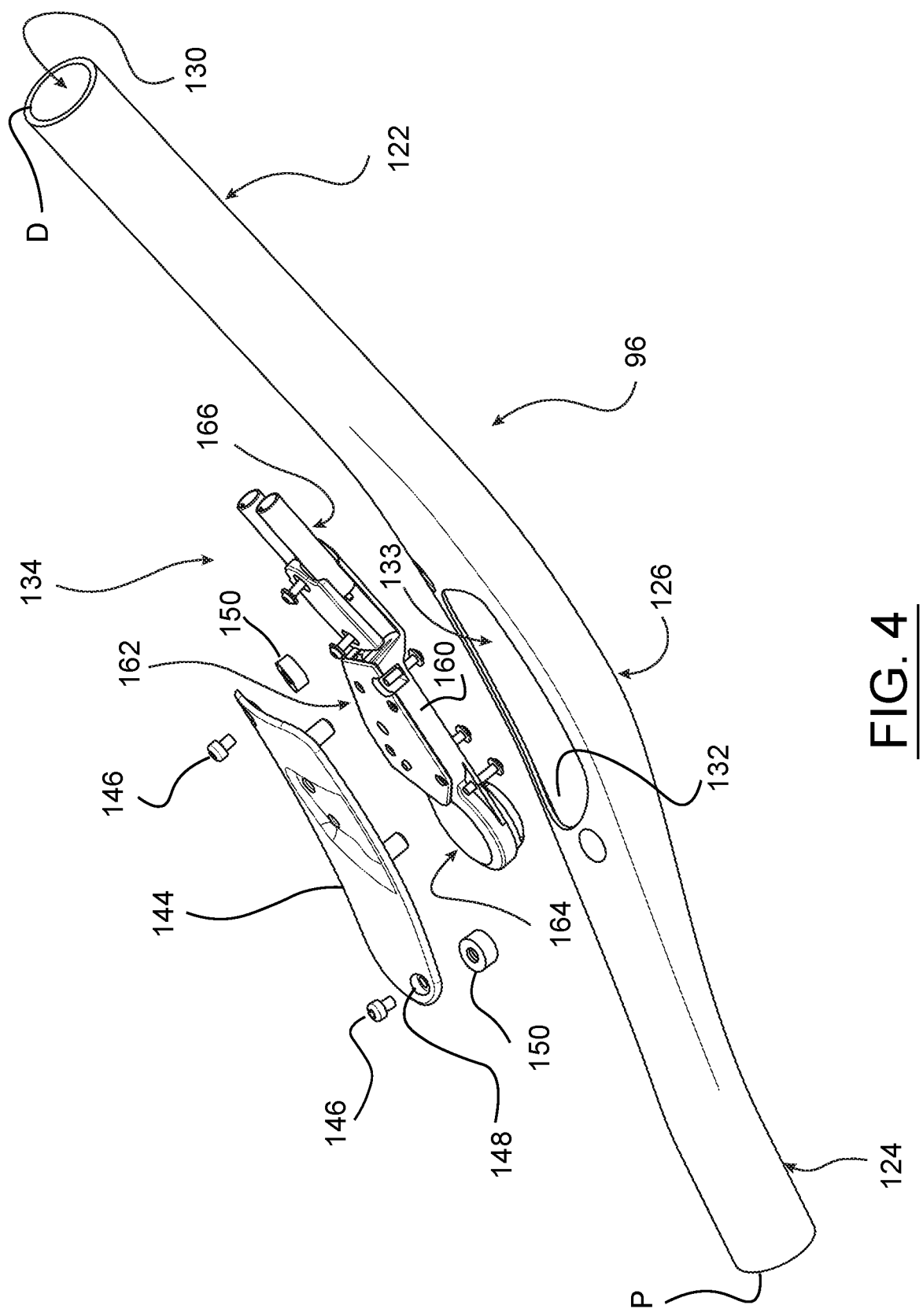
FIG. 4 shows a partial exploded perspective and reverse side view of the handlebar extension and integrated bicycle control device of FIG. 3.

Referring to FIGS. 1-4, the bicycle 50 in the disclosed example has at least one integrated bicycle control device 120, hereinafter the "control device 120", which can be mounted to a portion of the handlebar assembly 64. Referring to FIGS. 3 and 4, in this example the control device 120 is integrated into one of the bar extensions 96, which can be either the left-hand bar 96L or the right-hand bar 96R. As shown, each of the bar extensions 96L, 96R can include a separate control device 120. Though not shown herein, the control device or devices 120 can instead be integrated into one of or both of the pursuit bar segments 94 L, 94R, if desired. In other examples, the handlebar assembly may be a different type, such as a drop bar type, a bullhorn type, a bullmoose type, a flat type, a riser type, or any other type of handlebar style and design. The disclosed control device 120 can be integrated into these types of handlebars, if desired.

As shown in FIGS. 3 and 4, the bar extension 96 has somewhat of a tube shaped or tubular body 118. The body 118 can be entirely hollow or can be partially hollow with a race or bore to receive wires through the body. The body 118 of the bar extension 96 has a clamping or mounting portion 122 at a proximal end P of the bar. The mounting portion 122 is configured to be clamped or otherwise mounted, secured, fastened, joined, attached, or connected to the cradle 98 or the pursuit bar 94. The body 118 of the bar extension 96 also has a gripping portion 124 at a distal or free end D of the bar. The mounting end 122 and gripping portion 124 are joined to one another by a central transition portion 126 between the two ends. Depending on the type of handlebar assembly utilized, the mounting portion may be different to accommodate a different, direct type of attachment to a bicycle, such as to the head tube 66 of the bicycle 50, or attachment to another part of the alternative assembly. In this example, the handlebar assembly has two gripping portions 124, one on each of the bar extensions 96L and 96R. In one example, the gripping portions are at the distal ends but in other examples, the gripping portions may be near or adjacent the distal ends, but not entirely at the distal ends. In other examples, the bar configuration may result in the handlebar assembly having at most only one gripping portion accommodating both of a rider's hands or more than two possible gripping portions accessible for the rider's hands.

The shape of the body 118 of the bar extension 96 in this example, or the shape of another type of handlebar, can vary from the examples shown and described herein. In this example, the body 118 of the bar extension 96 has a relatively straight mounting portion 122, a slight upwardly curved transition portion 126, and a slight downwardly curved gripping portion 124. Other shapes are certainly possible within the scope of the present disclosure. Further, the bar extension, or other type of handlebar, can also be made from any suitable materials such as carbon fiber, aluminum, steel, composite, or other suitable materials and can be made from any suitable manufacturing process.

In this example, as shown in FIGS. 3 and 4, the body 118 of the bar extension 96 is at least partially hollow and thus defines an interior 130 along the tubular shape. An opening 132 is provided along at least part of the transition portion 126 of the body 118. In this example, the opening 132 is formed on a top side of the body 118 and opens into a receiving space or compartment 133, which is in and is a part of the interior 30 of the body. In other examples, as discussed below, the opening maybe located on a different side of the body. The cross-section shape of the body 118 of the bar extension 96 can vary over its length. In one example, a maximum width or diameter of the compartment in the transition portion 126 can be wider than a maximum width or diameter of an interior of the gripping portion 124, and/or the wall thickness can be more robust in the transition portion as compared to the gripping portion to provide rigidity and strength to the structure. The shape of the transition portion 126 can also be configured to accommodate installation and integration of the control device 120 into the bar extension 96, as discussed below. The shape and/or size of the gripping portion 124 may be such that the control device or one or more of its components are too large to fit within the gripping portion and yet the size and/or shape of the compartment within the transition portion 126 may accommodate the control device or its components.

Still referring to FIGS. 3 and 4, the basic components of the control device 120 are now described. In this example, the control device 120 includes a control element 134 positioned in the compartment 133 accessible through the opening 132 in the body 118 of the bar extension 96. The term control element is used herein to generally or generically define the electrical component assembly or base componentry that contains or includes the bulk of the electronic parts of the control device 120. The term is not intended to specifically limit the overall construction of the electronics assembly or base componentry. Thus, the control element may otherwise be, or be identified as, a junction box, a processor housing, a component unit or assembly, an electronics unit or assembly, or the like. The control device 120 also includes a user input mechanism or actuator 136 positioned at the distal end D of the gripping portion 124 on the body 118. The control device 120 further includes wires or cables, which include, in part, a cable C configured to extend along the interior 130 of the body 118 from the transition portion 126 to the gripping portion 124 to connect the control element 134 to the actuator 136. The wires or cables, in part, can also include auxiliary wires or cables R extending along the interior 130 between the transition portion 126 and the mounting portion 122 for purposes described below.

The control device 120, including the control element 134, is installed in the compartment 133 through the opening 132. A cover 144 is removably attachable to the body 118 over the opening 132 to close of the compartment 133. The cover 144 can be secured to the body 118 using fasteners, such as screws 146, or by other suitable methods. The body 118 may include mounting holes 148 adjacent the opening 132. The body 118 may also include inserts 150 secured within the body and aligned with the mounting holes. The inserts 150 can be plugged into the mounting holes 148 and can be glued, press fit, friction fit, welded, co-molded, or the like to secure them in place. The inserts 150 can be configured to receive and engage fasteners, such as the screws 146, to attach the cover 144 to the body. The cover 144 can be made from the same material as the body 118 of the bar extension 96 or can be made from a different material. In one example, the body 118 can be made from carbon fiber and the cover 144 can be made from a less expensive plastic material or can be a metal, such as a cast aluminum or a stamped steel. In an example the body 118 is made from carbon fiber and the cover 144 is not made from carbon fiber.

The control element 134 in this embodiment can be larger in size than a diameter of the gripping portion 124 or the mounting portion 122, as noted above. Thus, the control element cannot be installed by being fed into the distal end D or the proximal end P. Thus, the opening 132 and compartment 133 are provided in the transition portion 126, which can have a larger size in cross section than other parts of the body 118. The opening 132 and compartment 133 can be sized and shaped to accommodate different sized control elements 134, while maintaining a desired or standard smaller size and/or shape for the mounting portion 122 and gripping portion 124.

In the disclosed example, the actuator 136 can be a standard off the shelf part, such as a button type actuator, and can include a depressible button 152 received within a housing 154. The housing 154 can be configured to be press fit into the open distal end D of the gripping portion 124 on the body 118 of the bar extension 96. In this example, the housing includes a press fit mechanism 156 to help retain the actuator 136 in the distal end D. Other methods or mechanisms may be utilized to secure the actuator in the distal end D, as is described further below. In this example the retention or press fit mechanism 156 is carried on the housing 154 of the actuator 136. The mechanism 156 includes a plurality of flexible, circumferential webs or discs 158 spaced apart lengthwise along the housing 154. The discs or webs 158 are larger in diameter than the interior diameter of the distal end D of the body 118. Thus, the discs or webs 158 are sized to deformably and snuggly fit within the interior of the distal end D to help secure the actuator 136 in place. The webs or discs 158 may also be made from a material exhibiting characteristics to increase the surface friction between the mechanism 156 and body 118 as well. The interior 130 of the body 118 at or near the distal end D may also be modified or adapted to include a feature or features to aid in retaining the actuator attached to the distal end.

FIGS. 5A, 5B, 6, and 7 illustrate the control element 134 in greater detail. Referring to these figures, the control element 134 of the control device 120 in this example is a self-contained electrical assembly. The control element 134 includes electronic componentry for operating a bicycle component, such as one of the electromechanical gear changers 74, 76. The control element 134 has a housing 160 or case and the electronic componentry of the control element is contained in or carried by the housing. The control element 134 generally has a component portion 162, a power supply unit 164, and a connection portion 166, each defined at least in part by the housing 160. Each of these portions is described in greater detail below.

The component portion 162 is defined in part by a cavity 168 defined within an interior of the housing 160 and a cover 170, which can be secured by fasteners 172 to the housing. The cover 170 can be secured to the housing 160 to close off the cavity 168 and exclude water and other contaminants from entry into the cavity. A seal 174 may be interposed between the cavity 168 and the cover 170. The seal 174 may be a rubber seal membrane or layer, or any suitable material that satisfactorily seals the cavity 168 to prevent ingress of moisture or contaminants.

The component portion 162 in this example has a printed circuit board (PCB) 176 is disposed within the sealed cavity 168. Various electronic componentry may be mounted on or connected to the PCB 176. The PCB 176 may include a communication module 178 configured to transmit signals from the control device 120. In one example, the communication module 178 may be configured for wireless transmission of signals in the form of electromagnetic radiation (EMR), such as radio waves or radio frequency signals. Optionally, the communication module 178 may also be configured to receive signals. In one example, the communication module 178 may be configured to receive signals, which may be in the form of EMR such as radio waves or radio frequency signals. The communication module 178 can include or can be a transmitter or a transceiver. The PCB 176 may also include an antenna 180 that is in operative communication with the communication module 178 to send and optionally also receive EMR signals. The antenna 180 may be any device designed to transmit and/or receive EMR (e.g. TV or radio) waves.

In the disclosed example, the antenna 180 is on the PCB 176 in a position where it will be able to send signals without significant interference from the structure of the control device 120. As discussed below, the control device 120 is also positioned relative to the bar extension such that there is no significant interference from a rider's hand. In another example, to help reduce or prevent interference, the antenna 180 may be a wireless antenna. Such a wireless antenna can be disposed on the PCB 176 or may be positioned, at least in part, in or on a portion of the control device 120 that is separate and remote or spaced from the housing 160, as discussed further below.

The control device 120 also includes a controller 182, which in this example is also on the PCB 176. The controller 182 is operatively connected to the communication module 178 to perform electronic operations such as generating the signals related to one or more of shifting, pairing, derailleur trim operations, power management, and the like. The controller 182 may be programmable and configurable to generate signals to control the front and rear gear changers or derailleurs 74, 76, for example. In one example, the controller 182 may be an Atmel ATmega324PA microcontroller with an internal EEPROM memory. The communication module 178 may also be programmable and configurable to likewise transmit and/or receive signals to control the front and rear gear changers 74, 76. In one example, the communication module 178 may be an Atmel AT86RF231 2.4 GHz transceiver utilizing AES encryption and DSS spread spectrum technology supporting 16 channels and the IEEE 802.15.4 communication protocol. However, other suitable microcontrollers 182 and communication modules 178 may be utilized. Additionally, ancillary electrical and/or electronic devices and components may be used, as is well known in the art, to further enhance or enable the function and operation of the controller 182 and the communication module 178 and related components.

In one example, the control device 120 may include at least one light emitting diode (LED) 184, which may also be positioned on the PCB 176. The LED 184 may convey status information to a user or a rider relating to the electronic componentry and function of the actuator 136 or control device 120. The LED 184 in this example may be visible through a transparent part (not shown) of the seal 174 and a transparent LED window or cap 188 in or on the cover 170 of the cavity 168. In one example, the entire seal 174 may instead be transparent. Alternatively, only the part of the seal material that overlies the LED 184 may be configured to permit light through the seal 174.

Further, the electronic componentry may include one or more electrical switches 190. The electrical switches 190, when actuated, may cause operations to be carried out by the controller 182. Such operations may relate to signal transmission or reception, derailleur and control device 120 pairing, trim and/or shift operations, and the like. The switches 190 may generate signals to initiate or elicit an action and/or response from various mechanisms of the bicycle 50, such as the front and rear electromechanical gear changers or derailleurs 74, 76.

In this example, the first electrical switch 190 may include a switch or button contact 194 on the PCB 176. The contact 194 can be positioned to underlie a button 196, which can be positioned to cause the contact 194 to engage or close. In this example, the first electrical switch 190 is actuated by depressing the button 196. The seal 174 may include a membrane or layer or a through hole at 198 (see below), which is aligned with the switch contact 194 and the button 196. The cover 170 also has at least a first switch hole 200 aligned with the membrane 198 in the seal 174 and via which the button 196 extends through the cover. The button 196 can be spring or elastically biased outward through the hole 200 in the cover 170 and can be depressed to actuate the switch 190 by engaging or closing the contact 194. In this example, the switch contact 194 may thus be actuated through the seal 174 from outside the cavity 168 and the cover 170. A user or rider operates the first electrical switch 190 simply by depressing the button 196 toward the cover 170.

The button 196 may be integrally formed as a part of the seal 174, may be attached to the seal material, or may be a separate switch part. The button 196, if a separate part, may be attached to the PCB 176 (see FIG. 7) or may be captured in part by the cover 170 against the outside of the seal 174. The button may pass through a hole at 198 in the seal 174 if the button is connected directly to the PCB 176. Alternatively, the button 196 may operate through the membrane layer at 198 on the seal 174, whereby the integrity of the seal for the cavity 168 is not compromised. Other types of electrical switches may be used. The first electrical switch 190 may be an optional switch. The first electrical switch 190 may be used for operations related to pairing the control device 120 with a specific bicycle component, such as the front or rear electromechanical gear changers or derailleurs 74, 76, for trimming the derailleurs, or the like.

Figure 6:
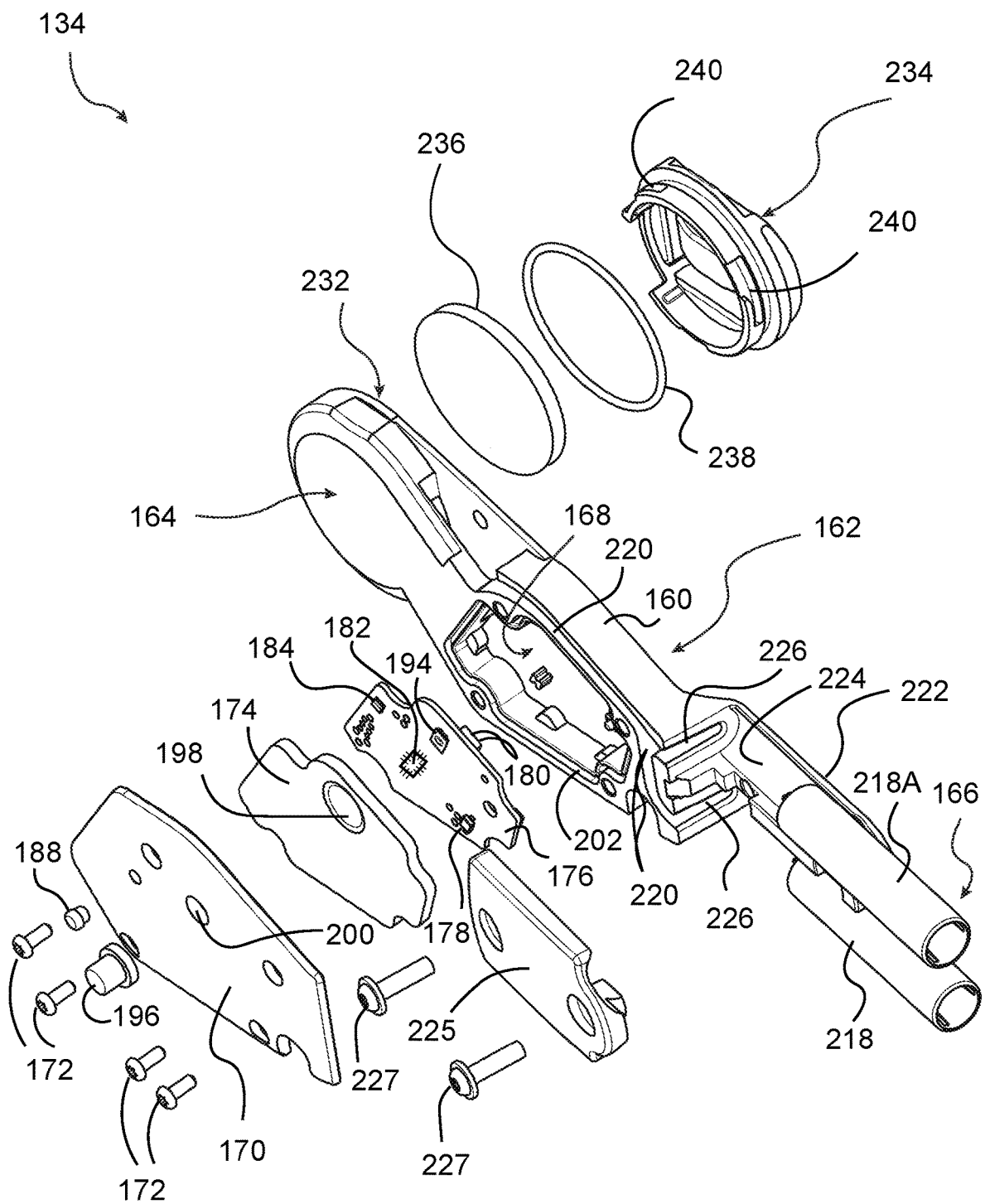
FIG. 6 shows an exploded perspective view of the control element of FIGS. 5A and 5B.

The electronic componentry on the PCB 176 and within the cavity 168 is retained and sealed in place in the cavity. The seal 174 overlies the PCB 176 and is sandwiched between the PCB and the cover 170 when the cover is fastened to the housing 160. Referring to FIGS. 6 and 7, the seal 174 may include a rib (not shown) around the perimeter of the seal material. Likewise, the housing 160 may include a groove 202 around the opening into the cavity 168. The rib can seat in the groove 202 to create a tight environmental seal when the cover 170 is secured to the housing 160. The material layer of the seal 174 may include raised or thickened regions, which may be positioned to coincide with electrical switches, such as the switch 190, to encourage effective force transfer from the switch actuators, such as the button 196, to the switch contacts, such as the contact 194.

Referring to FIGS. 3, 4, and 8, the control device 120 also includes a set of cables, herein called a wiring harness 210. In this example, the wiring harness 210 may be a provided in a pre-assembled bundle. In this example, the wiring harness 210 includes a multiple pin connector 212 that can be connected to the PCB 176 in a known manner. A power line 214 extends from the connector 212 and has two wires 214$p$, 214$n$, which are connected to positive and negative terminals, respectively, of the power supply unit 164 of the control element 134, as discussed further below, to receive power to operate the electronic components. The wiring harness also has two auxiliary lines 216, 216A in this example. Each auxiliary line 216, 216A extends from the connector 212 and terminates at an auxiliary connector or jack 218, 218A, respectively. The housing 160 includes routing grooves 220 adjacent and around at least part of the opening into the cavity 168. The power line 214 and auxiliary lines 216, 216A are received in and guided by the routing grooves 220 to their respective destinations. The grooves 220 and lines 214, 216, 216A are covered up by the cover 170 when the cover is installed on the housing 160 over the cavity 168.

Figure 5A:
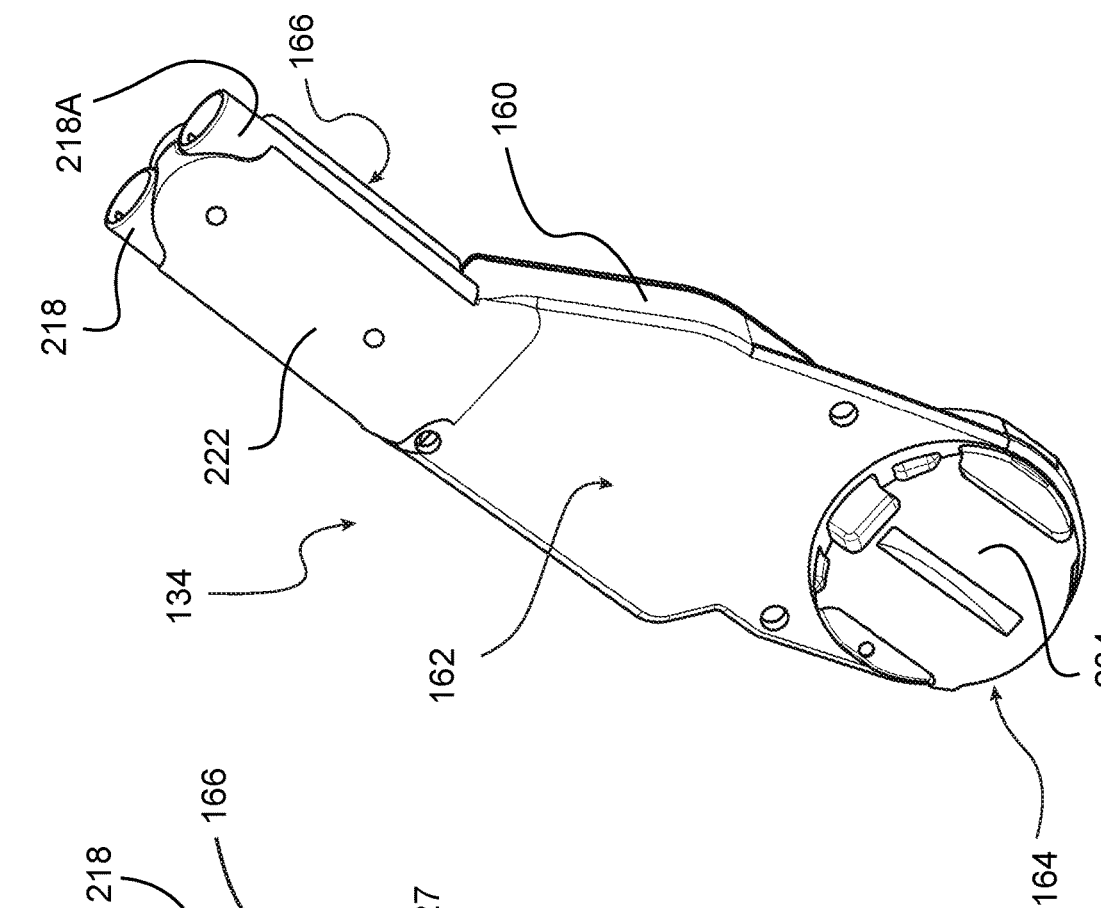
FIGS. 5A and 5B show opposite side perspective views of one example of a control element of an integrated bicycle control device, such as that depicted in FIGS. 3 and 4, and according to the present disclosure.
Figure 5B:
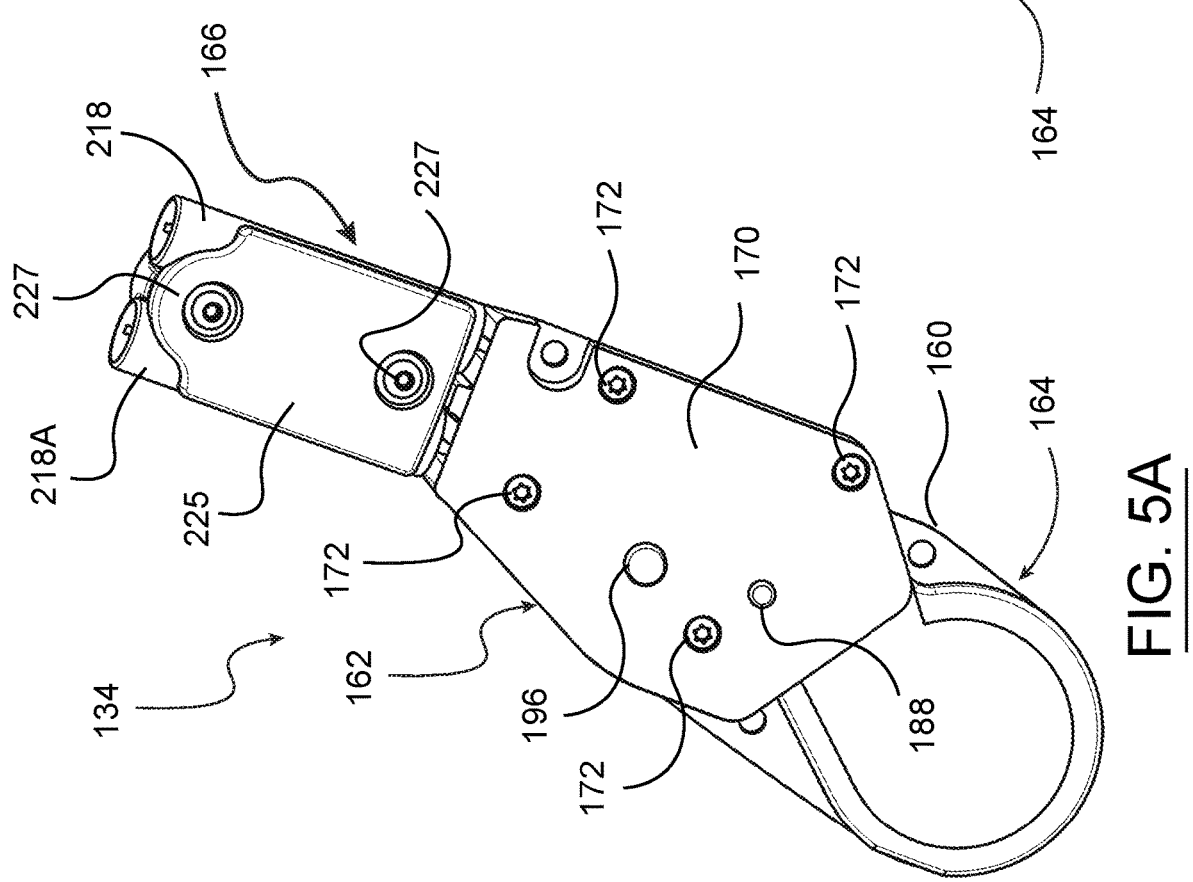

Referring to FIGS. 5A, 5B, and 6, the connection portion 166 of the control element 134 in this example includes an accessory jack holder 222 extending from the component portion 162. The holder 222 defines two receptacles 224 disposed side-by-side, each shaped to accepting and retain one of the jacks 218, 218A of the auxiliary lines 216, 216A. The groove 220 continues from the face of the housing 160 around the opening of the cavity 168 and splits into two separate slots 226. Each slot 226 terminates adjacent a corresponding one of the receptacles 224 for guiding the respective auxiliary line 216 to the receptacle. The accessory jacks 218, 218A are thus connected to the PCB 176 and thus to the power supply unit 164 via the auxiliary lines 216, 216A and the connector 212 to receive power and to operate any components connected to the jacks. Referring to FIGS. 5A and 6, a jack cover 225 can be fastened to the holder 222 with fasteners 227 to capture the jacks 218, 218A in the receptacles 224. The jack cover 225 can have shaped receptacles (not shown) that also conform to the shape of the jacks 218, 218A to aid in securely holding the jacks in place against the holder 222.

In this example, the auxiliary jacks 218, 218A are carried on the ends of the auxiliary lines 216, 216A and are female connectors or jacks in this example. Alternatively, each of the accessory jacks 218, 218A may be formed integrally as a part of the holder 222 and the lines 216, 216A could then be connected to the integral jacks. The control element 134 can alternatively have no auxiliary jacks, one such jack, or more than two such jacks, if desired. A connector (not shown) for an optional remote button, switch, or actuator 228 (see FIG. 2, for example, which has additional actuators 228 on the base bar or pursuit bar 94) may be connected to the control device 120 through the accessory jack 218A of the connection portion 166 on the control element 134. The actuator 136 in this example can be connected to the accessory jack 218 via a cable C, as shown in FIG. 3, utilizing one of the accessory jacks. In another example, the actuator 136 could be hardwired to the control element using another cable connected to the wiring harness 210, leaving both jacks 218, 218A accessible for connecting optional accessories or remote actuators. In the disclosed example, the control element 134 provides power and electrical connection and operation between the actuator 136, the optional remote actuator 228, and the control element 134. The accessory jacks 218, 218A may be configured to accept connectors from optional additional and/or other remote electrical switches or other devices (not shown), as well as remote actuators 228, to connect them to the control device 120. When no accessories or remote components are connected to the control element 134, the accessory jacks 218, 218A may be left open or may be sealed from moisture and contamination by inserting plugs (not shown) into the jacks.

In this example, the groove 220 and the slots 226 may be filled with an epoxy seal. Thus, when the cover 170 is installed, a watertight seal is created around the cover 170 as well as within the slots and grooves 226, 220. The epoxy can secure the lines 214, 216, 216A in place and can create a seal that prevents water and other contaminants from reaching the cavity 168. The epoxy seal material can also be used at the connection between the jacks 218, 218A and the auxiliary lines 216, 216A.

Still referring to FIGS. 5A, 5B, 6, and 7, in the disclosed example, the wires 214p, 214n of the power line 214 are connected to (+) and (−) terminals on the power supply unit 164 of the control element 134. The power supply unit 164 is configured to define a power supply, i.e., a self-contained battery unit as a part of the control element 134. Thus, the control element 134 in this example is a self-contained electrical assembly including a power supply, wireless communication electronics, and accessory connection capability.

The housing 160 at the power supply unit 164 is configured to create a power supply receptacle or case 232 and a battery cover 234. The power supply case 232 is formed as a recess in the housing 160 and, in this example, is integrally formed as a part of the housing. In another example, the power supply case may be a separate component that is fastened to the housing 160 via screws, snap features, adhesive, or another suitable means. In this example, the power supply unit 164 includes a conventional and replaceable coin cell type battery 236, which is received within a receptacle defined by the case 232 and open to the exterior of the housing 160. Alternatively, the power supply can be a non-replaceable and/or rechargeable battery. The battery 236 may be configured to provide power to the PCB 176 for the antenna 180, the controller 182, and/or the LED 184, as well as to any remote switches or actuators 228 via the accessory jacks 218. The cover 234 is rotatable to install over the receptacle in the case 232 and can be reverse rotated to be removed to access the battery 236. The cover 234 can include an elastomeric O-ring or gasket 238 around its periphery to create a moisture and contaminant proof seal against the case 232 on the housing 160 when installed.

Referring to FIGS. 5A and 7, the power supply unit 164 includes the positive and negative terminals or contacts on the back side of the power supply case 232. These terminals can be connected to battery contacts (not shown) within the receptacle of the case 232 to contact the battery 236. The exposed contacts or terminals on the back side of the case 232 can be covered and encapsulated (and hidden as in FIG. 7) by an epoxy seal to secure the connections and to protect the contacts and the wires 214p, 214n from water, contaminants, and the elements. This epoxy seal could similarly be provided or replaced via a cover piece that is attached to the back side of the case 232 via plastic welding, fasteners, adhesive, or another suitable means.

The battery cover 234 may be secured via conventional mechanical threads to the case 232. Instead, the cover 234 may be secured to the case 232 via a set of tabs (not shown) or keys and slots or ways 240 that engage one another when the cover is twisted into place. In this example, the slots or ways 240 are on the cover and, thus, the corresponding tabs or keys would be provided in the unseen receptacle in the case 232. The reverse arrangement may also be used. The O-ring 238 is compressed between the cover 234 and the case 232 or a surface of the housing 160 to provide a second seal for the power supply receptacle and battery 236 against water and other contamination. The battery cover 234 and/or the case 232 may also contain additional features among the cover 234 and case 232 that, when engaged, inhibit unintentional movement of the battery cover 234.

In one example of the present disclosure, a control device 120 is mountable to any portion of a handlebar arrangement or assembly, as long as the control element 134 is spaced from a gripping portion. In one example, the bicycle 50 may include a pair of the control devices 120, one on each of the left and right sides of the handlebar assembly 64. As shown in FIG. 2, the handlebar assembly 64 includes the two bar extensions 96, and each bar extension carries a control device 120, including an actuator 136. As shown in FIG. 3, the actuator cable C extends along the interior of the bar extension 96 from the connection portion 166 of the control element 134 and is connected to the actuator 136. This arrangement can be provided within each of the left-hand and right-hand bar extensions 96L, 96R. Thus, the actuator 136 for each of the control devices 120 can be connected to a separate and distinct control element 134.

One having ordinary skill in the art should understand that together the pair of control devices 120 may be configured to operate the respective front and rear electromechanical gear changers or derailleurs 74, 76. However, one should also understand that the control devices 120 may be utilized to operate other bicycle components as well. In one example, the pair of control devices 120 may be identical to one another or may be different from one another, depending on the intended application for each device. In another example, the two actuators 136 shown in FIG. 3 could be connected to the same control element 120, one to each of the jacks 218 and 218A.

Figure 9:
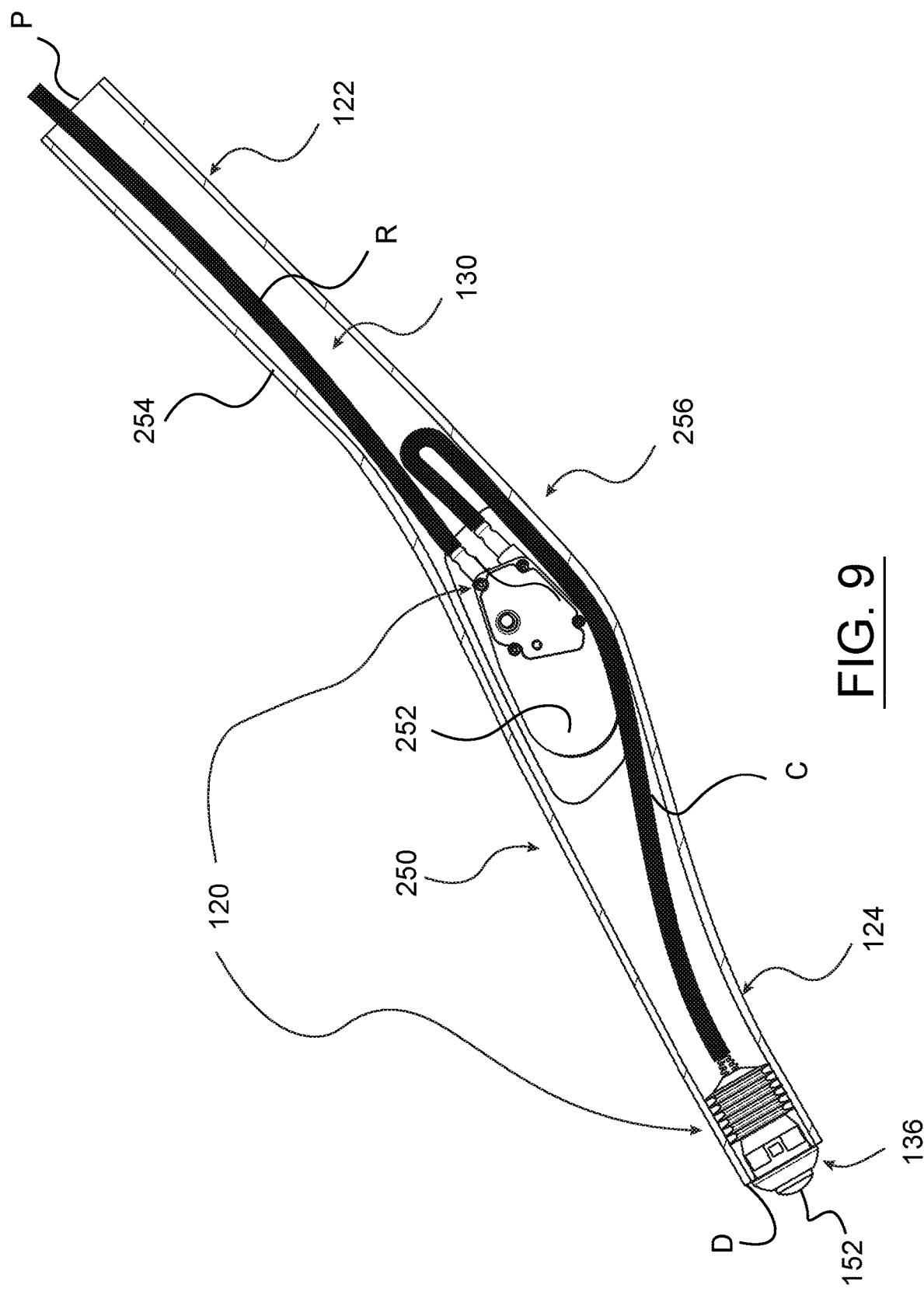
FIG. 9 shows a side view in cross section of another example of a handlebar extension and including an integrated bicycle control device according to the present disclosure.
Figure 10:
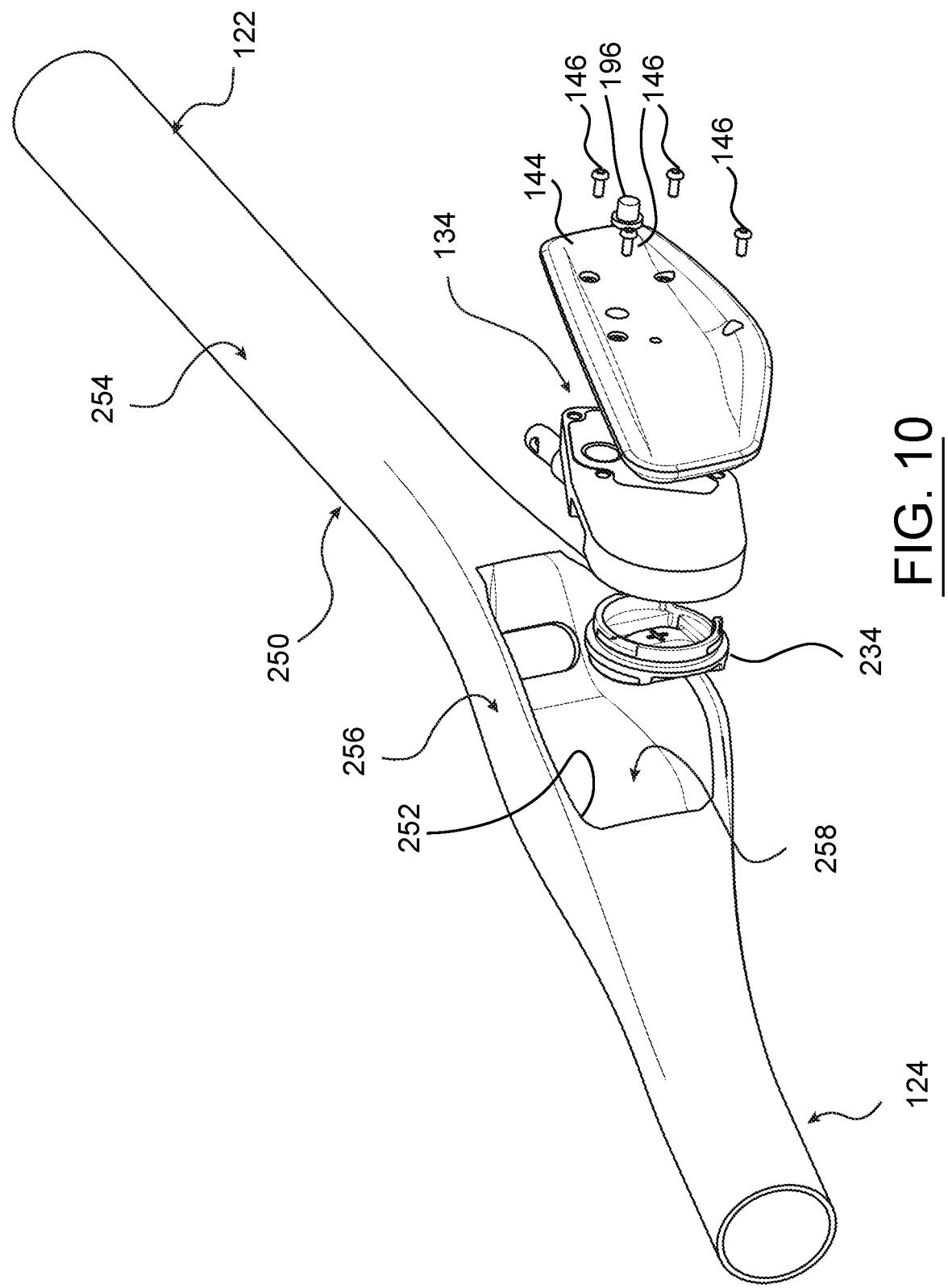
FIG. 10 shows a partial exploded perspective and side view of the handlebar extension and integrated bicycle control device of FIG. 9.

In the disclosed example, the configuration of the disclosed control device 120 may be varied and the configuration of the handlebar part into which the control device is integrated may also be varied. Referring to FIGS. 9 and 10, an alternate example of a bar extension 250 is illustrated. In the prior example, the bar extension 96 includes the opening 132 on a top side of the body 118 for access into the compartment 133. In this example, the bar extension 250 includes an opening 252 on a side of a body 254 of the bar extension. The construction of the control device 120 and the control element 134 in this example is essentially the same as in the prior example. However, the control device 120 is installed into the body 254 of the bar extension 250 from the side via the side opening 252. The body 254 in this example again has a mounting portion 122 and a gripping portion 124 that can be identical to the earlier described bar extension 96. However, the body 254 can have a modified transition portion 256 to accommodate the side opening 252 and a different shaped compartment 258 within the body to accommodate a different installation orientation for the control element 134.

Figure 11:
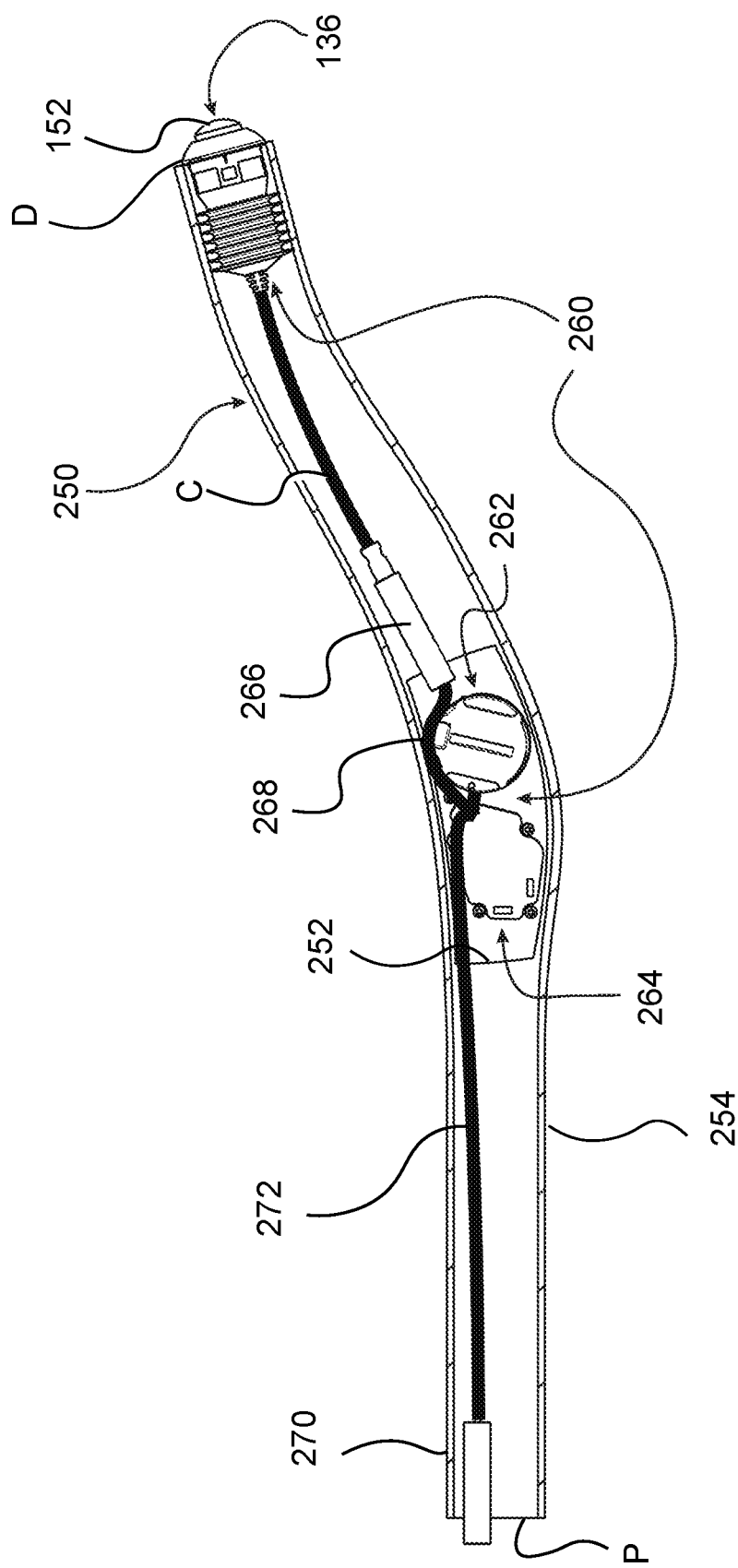
FIG. 11 shows a side view in cross section of another example of a handlebar extension and integrated bicycle control device according to the present disclosure.

FIG. 11 shows an alternate example of a control device 260 installed within the bar extension 250 depicted in FIGS. 9 and 10. In this example, the control device 260 has a separate power supply unit 262, housing the power supply components, and a separate electrical unit 264 housing the PCB, controller, LED, communication module, and the like. In this example, the actuator 136 is secured in the distal end D of the body 254 of the bar extension 250 and is connected via a cable C to an auxiliary jack 266. In this example, the auxiliary jack 266 is loose and connected to the power supply unit 262 and electrical unit 264 by a line 268. Likewise, an auxiliary jack 270 is loose at the proximal end P of the body 254 on the bar extension 250 and is connect to the power supply unit 262 and electrical unit 264 via a line 272. This example illustrates a different arrangement for an integrated bicycle control device provided as a part of a handlebar part for a bicycle.

Figure 12:
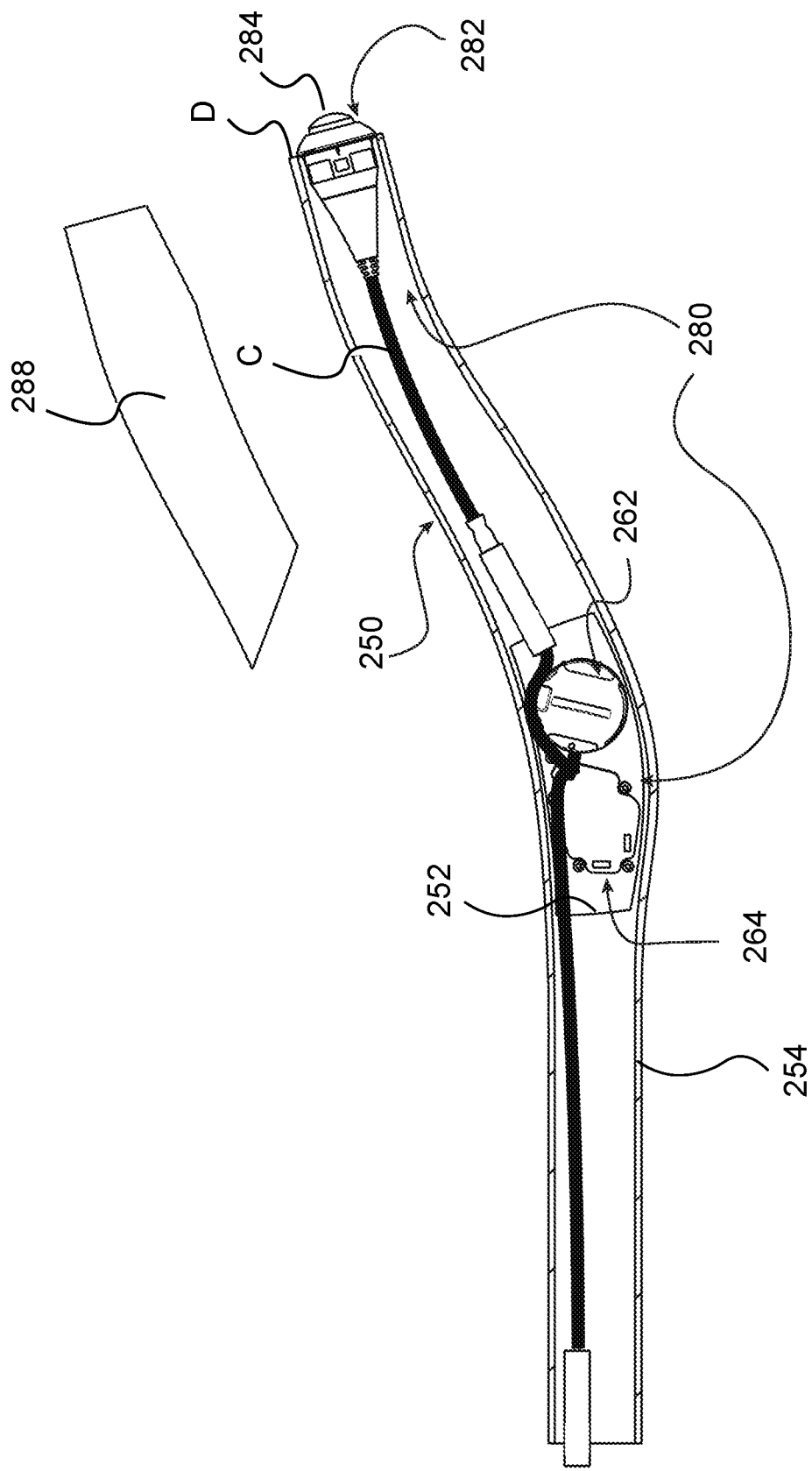
FIG. 12 shows a side view in cross section of another example of a handlebar extension and integrated bicycle control device according to the present disclosure.

FIG. 12 shows another example of a modified control device 280 that is integrated into a bar extension 250 that is identical to that shown in FIGS. 9-11. In this example, most of the components of the control device 280 are similar to those of the control device of 260 of FIG. 11, including the power supply unit 262, electrical unit 264, cable C, jacks 266, 270, and lines 268, 272. The only difference in this example is that an actuator 282, which has a button 284, is secured to the distal end D of the body 254 by glue or an adhesive material instead of being press fit or friction fit. In this example, the actuator 282 does not include the press fit mechanism 156 of the prior examples.

FIG. 12 also generically illustrate a grip cover or handle cover 288, which can be received over the gripping portion 124 of the bar extension 250. The grip cover 288 can be added to the exterior of the body 254 over the gripping portion 124. The grip cover 288 can be shaped and sized to be comfortably grasped by a hand of a user or rider. As noted above, the bar extension 250 can be formed of a carbon fiber material or another suitable material of sufficient strength and rigidity, as desired. The grip cover 288 can be formed of any suitable material, such as natural and/or synthetic elastomeric materials and may be designed to present a comfortable interface with the rider and to reduce the tendency to become detached or moved from its position on the exterior of the gripping portion 124 of the bar extension 250. For example, the grip cover 288 may be formed of a flexible thermoplastic elastomer (TPE) such as Santoprene™.

FIGS. 22-29 show an alternate example of a bar extension 550, similar to the example depicted in FIGS. 9 and 10. Although not shown, this example may also include other elements as described in bar extensions herein. The bar extension 550 may include a control device as described herein, as well as other elements, portions, and/or parts of other provided examples. For example, the device may include auxiliary jacks, buttons, cables, gripping portions and elements, as well as any other part described herein.

Figure 24:
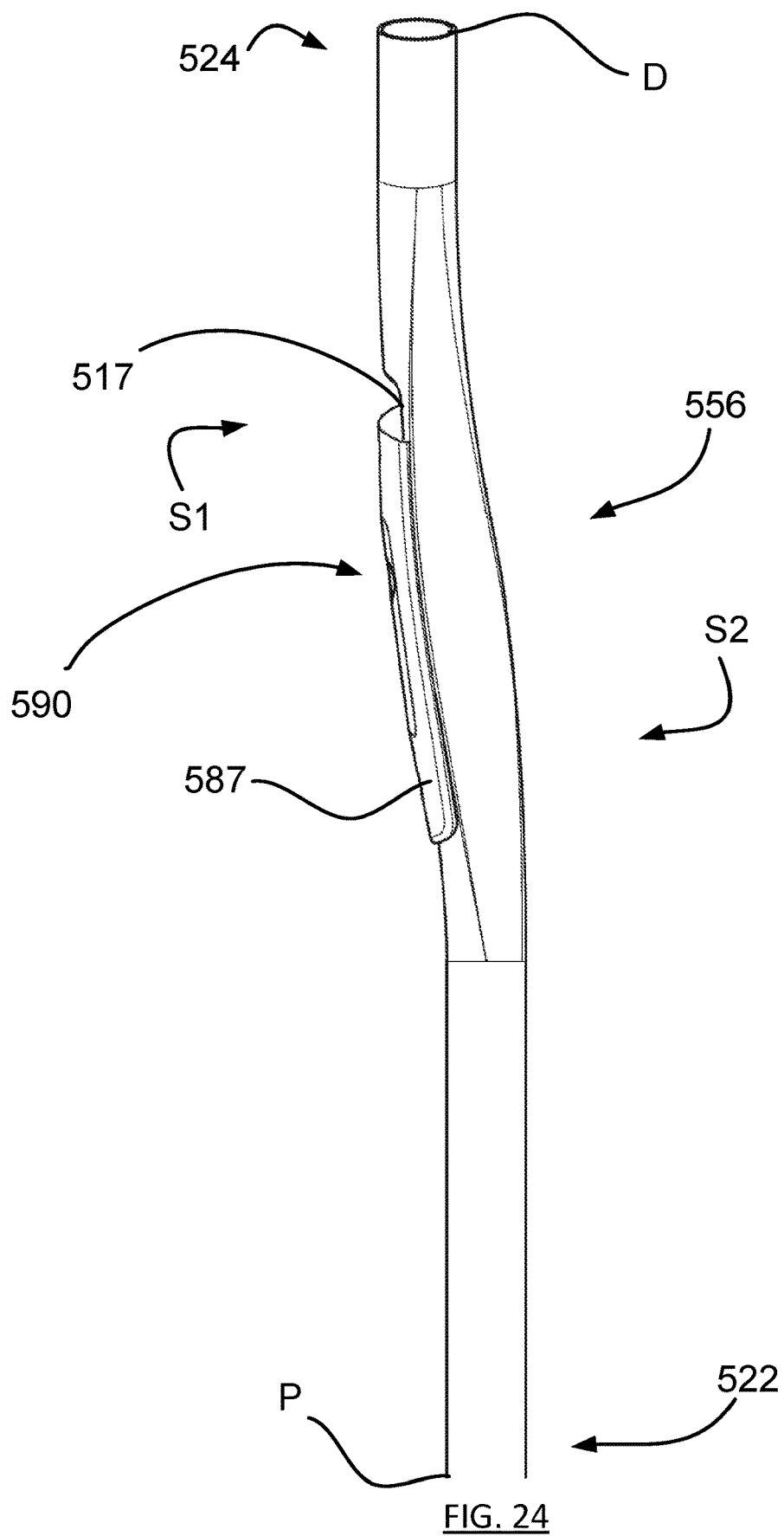
Figure 26:
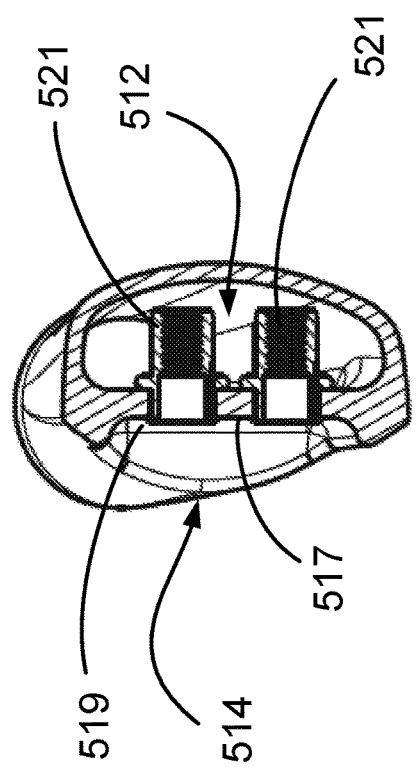
Figure 25:
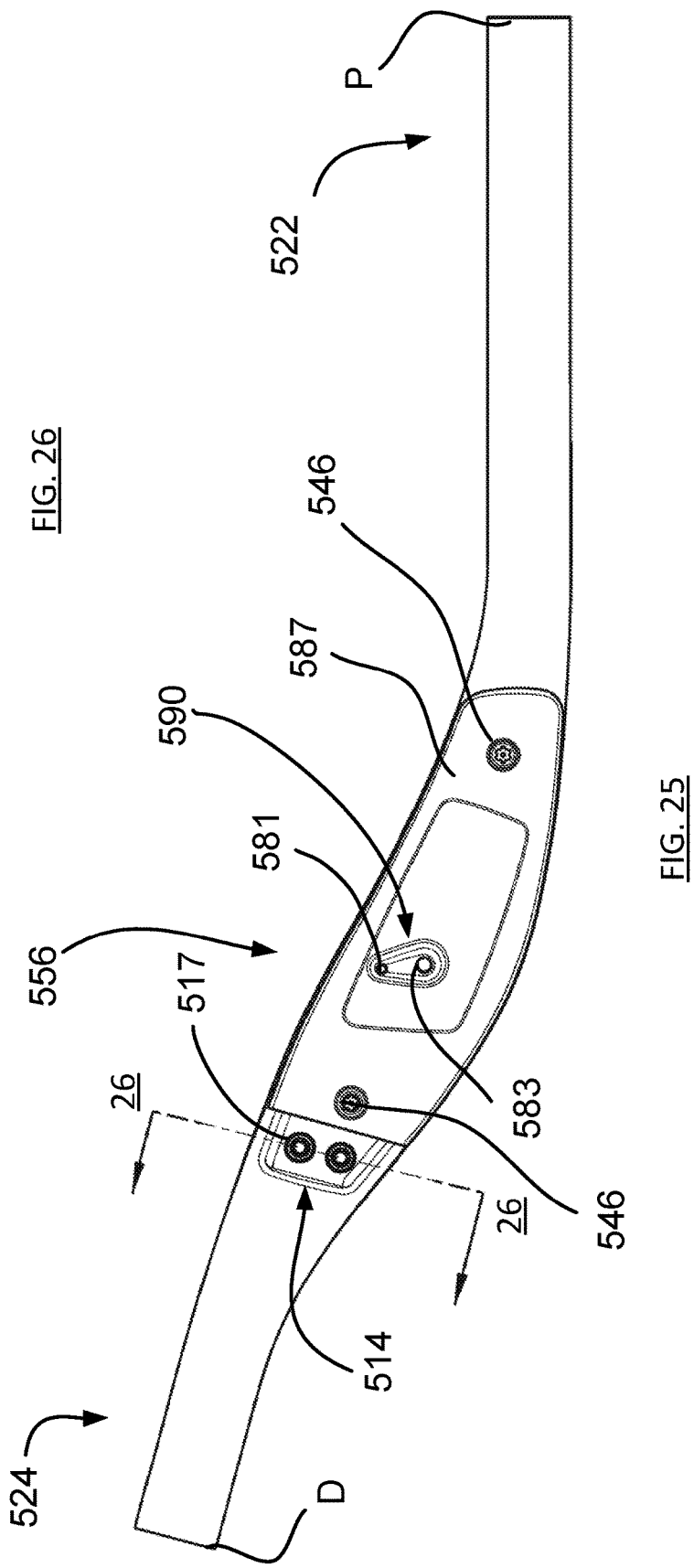
Figure 28:
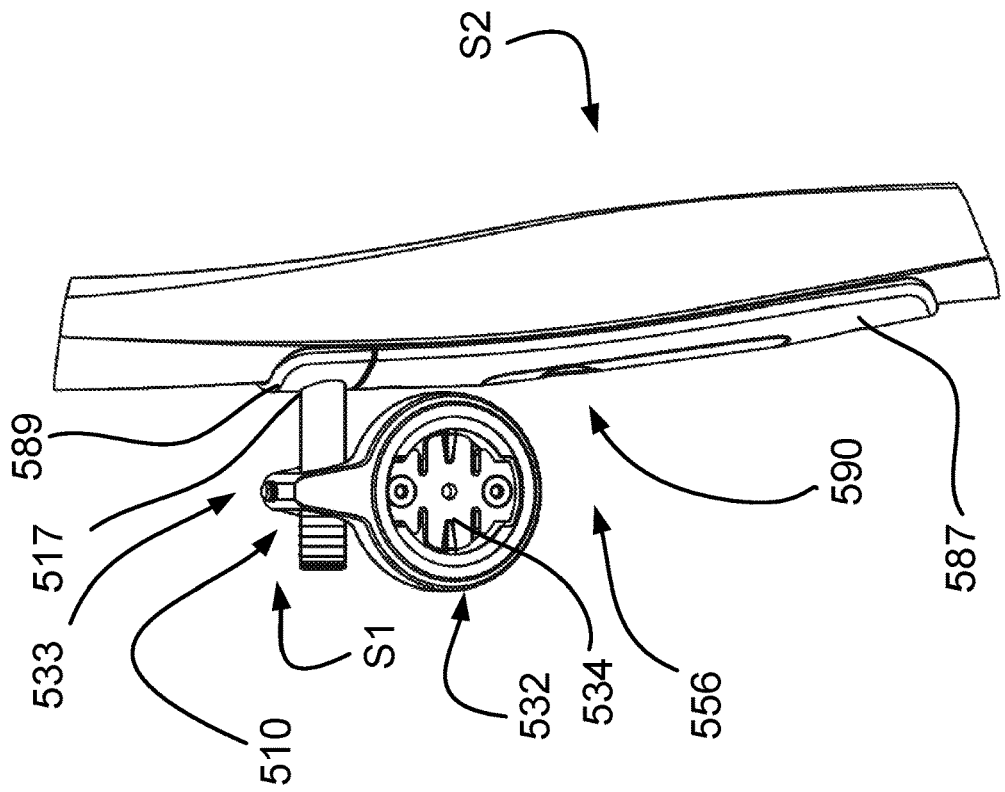
Figure 27:
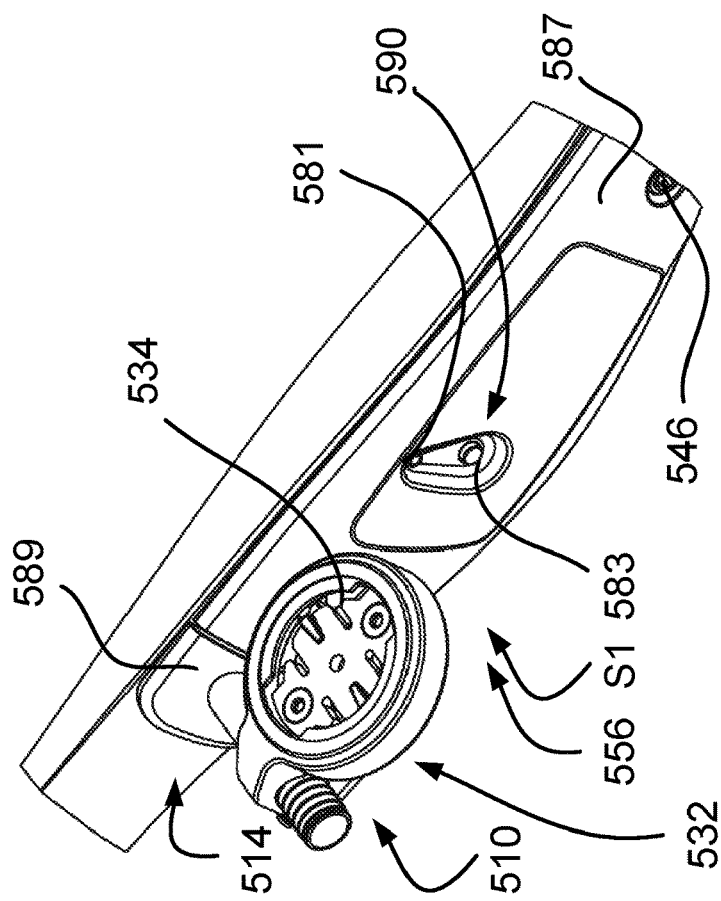
Figure 29:
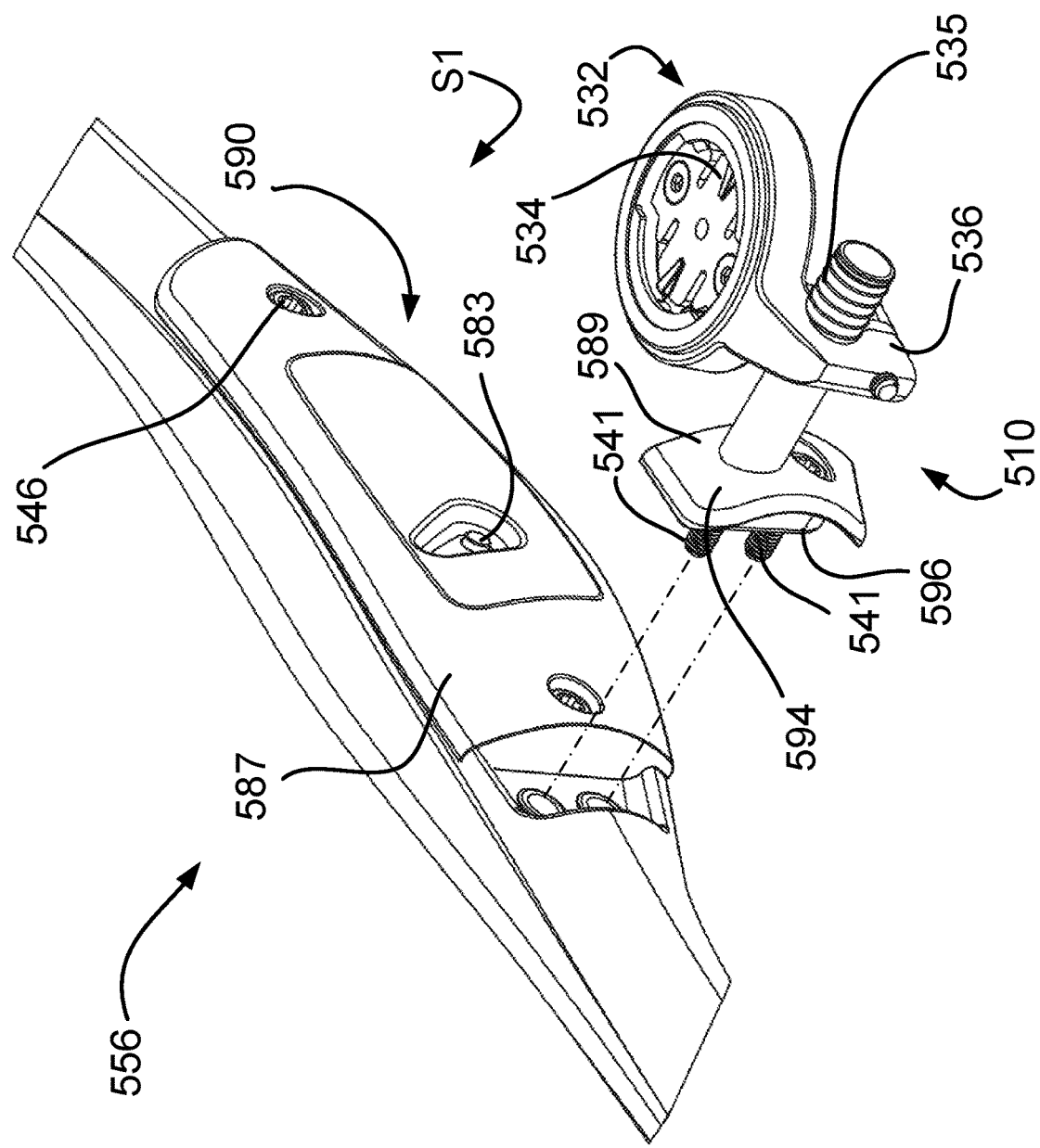
Figure 30:
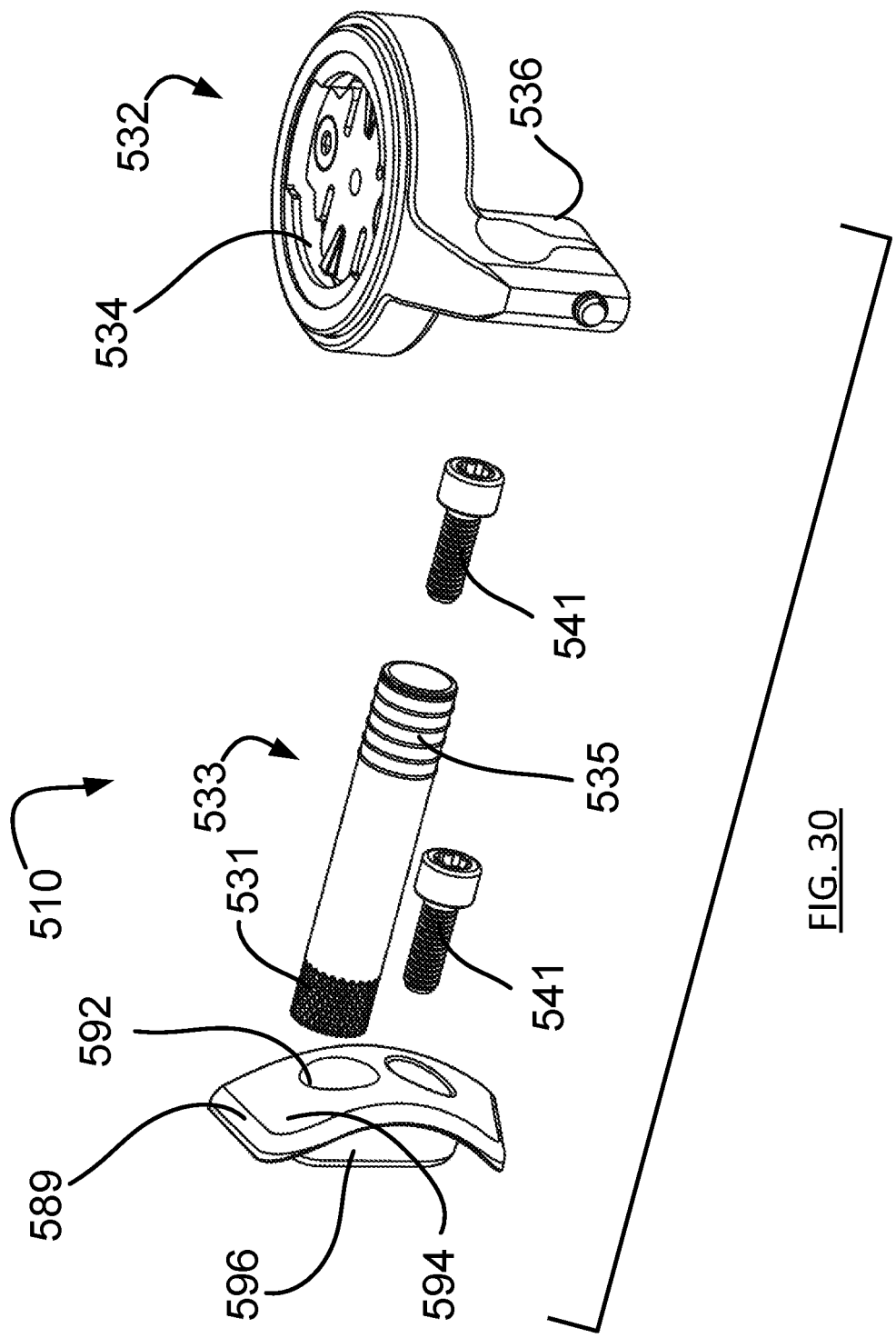
FIG. 30 shows a bicycle accessory attachment device of the example shown in FIGS. 22-29.

A bicycle accessory attachment device is also shown in FIGS. 22-23 and FIGS. 27-30. FIGS. 24-26 illustrate the bar extension 550 without the bicycle accessory attachment device and without a part of a cover 588 to show accessory attachment structure. This example illustrates a different arrangement for an integrated bicycle control device provided as a part of a handlebar part for a bicycle.

In this example, the bar extension 550 includes an accessory attachment portion 514. The accessory attachment portion 514 includes integrated accessory attachment structure 512. The accessory attachment structure 512 is configured to attach to an accessory attachment device 510. The accessory attachment device 510 includes structure sized and shaped to attach to the accessory attachment structure 512 and an accessory or other device 508, such as a bicycle computer, light emitting element, or other device. The bar extension 550 has a first side S1 and a second side S2. For example, the bar extension 550 may be configured such that it has an inboard side configured to face a central plane of a bicycle when attached, and an outboard side opposite the inboard side. The structure of a curve of the device may indicate and/or differentiate the outboard side from the inboard side. In an embodiment, the accessory attachment structure 512 of the accessory attachment portion 514 is configured such that an accessory attachment location 517 of the accessory attachment structure 512 to the accessory attachment device 510 is disposed on the first side S1, such as the inboard side.

In an embodiment, a pair of bar extensions 550 may be provided to be installed on reciprocal sides of the bicycle. One or both of the bar extensions may include the accessory attachment structure 512.

The accessory attachment portion 514 may be disposed in various locations of the bar extension 550. In an embodiment, the accessory attachment portion 514 is located closer to the distal portion D of the bar extension 550. For example, the accessory attachment portion 514 may be disposed in the transition portion 556 closer to the gripping portion 524 than the mounting portion 522 of the bar extension 550.

In this example, the bar extension 550 also includes a cover 588. The cover 588 may include multiple cover parts. For example, the cover may include a first cover part 587. The first cover part 587 may be an electronics cover. For example, similar to other covers described herein, the first cover part may be positioned and/or configured to cover and/or seal an interior compartment that houses electronic components, such as control device elements, one or more power supplies, and/or other elements. The cover 588 may cover a single opening, or multiple openings. The multiple openings may provide access to a common interior space, or different interior spaces. The first part may include a seal element 585, such as a gasket or O-ring configured to seal the compartment when the first cover part 587 is installed. The first cover part may be secured or otherwise attached to the bar extension 550 using fasteners 546, such as screws or bolts.

In this example, the bar extension 550 cover 588 also includes a second cover part 589. The second cover part 589 may be positioned adjacent to the first cover part 587. In the illustrated example, the second cover part 589 is disposed in the transition portion 556, between the first cover part 587 and gripping portion 524. The second cover part 589 includes an exterior cover surface 594. the second cover part 589 may also include a positioning member 596 configured to contact the base 519 and position the exterior cover surface 594 relative to the body of the extension 550. The second cover part 589 may be installed in the extension with or without the accessory attachment device 510.

The first cover part 587 may include other elements or characteristics. For example, the first cover part 587 may be formed of a material operable to allow radio frequency signals passage therethrough. For example, the first cover part may be formed of a plastic, or other non-metallic material or non-carbon fiber infused material.

The first cover part 587 may also include a user interface portion 590. The user interface portion 590 may include elements configured to provide input from, or communication to, a user. For example, the user interface portion 590 may include a button 583 which may interact with a control device element to cause an action or adjustment of a mode of the bar extension 550. The user interface may also, or alternatively, include a visual indicator 581, such as an LED light or screen for providing information to a user. For example, an LED light visual indicator 581 may flash to indicate a particular active operational mode, change of mode, or action.

In an embodiment, the first cover part 587 and the accessory attachment location 517 are located on a same side of the bar extension 550. For example, both the first cover part 587 and the accessory attachment location 517 are located on the first side S1 or inboard side.

FIG. 26 provides a sectional view of the bar extension 550 at the accessory attachment portion 514 as indicated in FIG. 25. The accessory attachment portion 514 includes accessory attachment structure 512. In an embodiment, the accessory attachment structure 512 includes a base surface 519 and securing structure, such as fastener securing features. For example, as is illustrated in FIG. 26, fastener securing features 521 may include threaded elements, such as formed threaded inserts, configured to attach and/or secure fasteners for attaching the second cover part 589 with fasteners 541. The formed threaded inserts may be configured so as to pass through the base surface 519 and include a threaded portion of the inserts within an interior space of the bar extension. The fastener securing features may be formed of a same material as the body of the bar extension 550, of the fastener securing features may be formed of a different material. For example, the fastener securing features may be formed of a metal material, whereas the body is formed of a carbon fiber reinforced plastic.

The accessory attachment device 510 includes an adapter 532 with an accessory attachment interface 534, for example a GARMIN® type bicycle computer mount interface.

The adapter 532 may be attached to the extension 550 with a connecting member 533. In an embodiment, the connecting member 533 includes an extension attachment portion 531, which may include attachment facilitating features, such as knurling or other securing features to secure the connecting member 533 to an opening 592 in the extension 550. As illustrated, the opening 592 is formed in the second cover part 589, but in other embodiments, the opening 592 could be positioned in other parts of the extension 550 body. The connecting member 533 also includes an adapter attachment portion 535 configured for attachment to a securing portion 536 of the adapter 532. The securing portion 536 of the adapter 532 may be configured to allow angular adjustment of the adapter 532 about the connecting member 533. For example, the securing portion 536 may have a rounded vacant interface into which the adapter attachment portion 535 may be inserted. The securing portion then may include a tightening mechanism, such as a threaded clamping device, to secure the adapter 532 to the connecting member 533. The adapter attachment portion 535 may include attachment feature such as circumferential ridges or ribs to secure the adapter axially, yet still allow untightened rotational adjustment.

Figure 13:
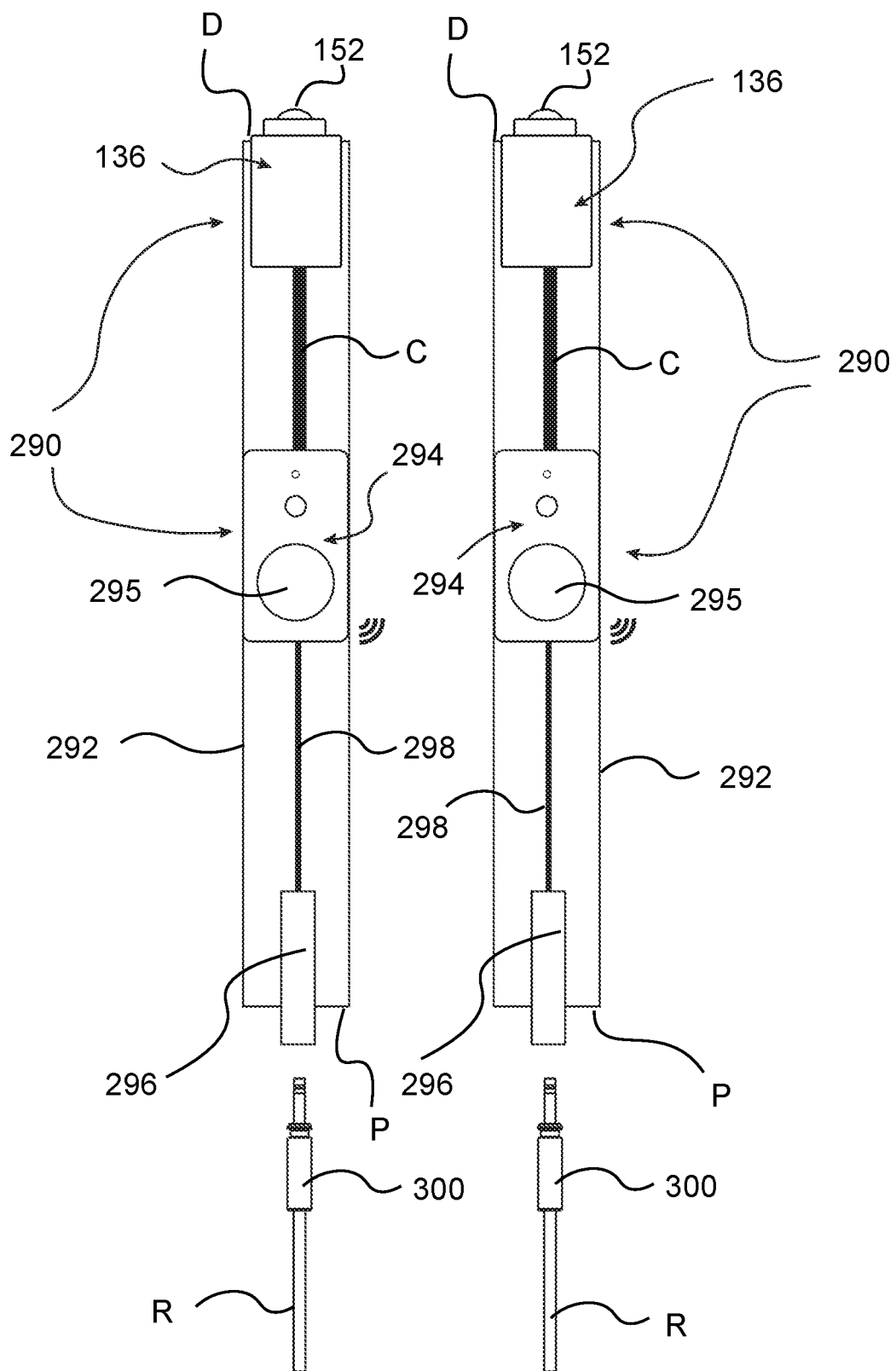
FIGS. 13-21 show various alternative examples of handlebar extensions and integrated bicycle control devices and arrangements according to the present disclosure.

FIGS. 13-21 illustrate additional alternative examples of integrated bicycle control device arrangements. FIG. 13 shows two control devices 290, one integrated into each of two handlebar parts, which may be time trial bar extensions 292, of a bicycle. In this example, each control device 290 has a control element 294 with a power supply or battery 295, an actuator 136 at a distal end D of the bar extension 292, and an auxiliary jack 296 exposed at a proximal end P of the bar extension. The control element 294 is disposed at the transition portion of the bar extension 292. In this example, a cable C for each actuator 136 is hardwired to the control element 294. Likewise, an auxiliary line 298 is connected to the auxiliary jack 296 and is hardwired to the control element 294. An auxiliary cable R from a remote actuator (not shown, such as an actuator 228 on a base bar or pursuit bar) has a male connector 300 that can be inserted into the auxiliary jack 296. In this example, the auxiliary line 298 and jack 296 can be pushed into the proximal end P of the bar extension 292, which can then be cut to a desired length before being mounted, assembled, or installed on a bicycle.

Figure 14:
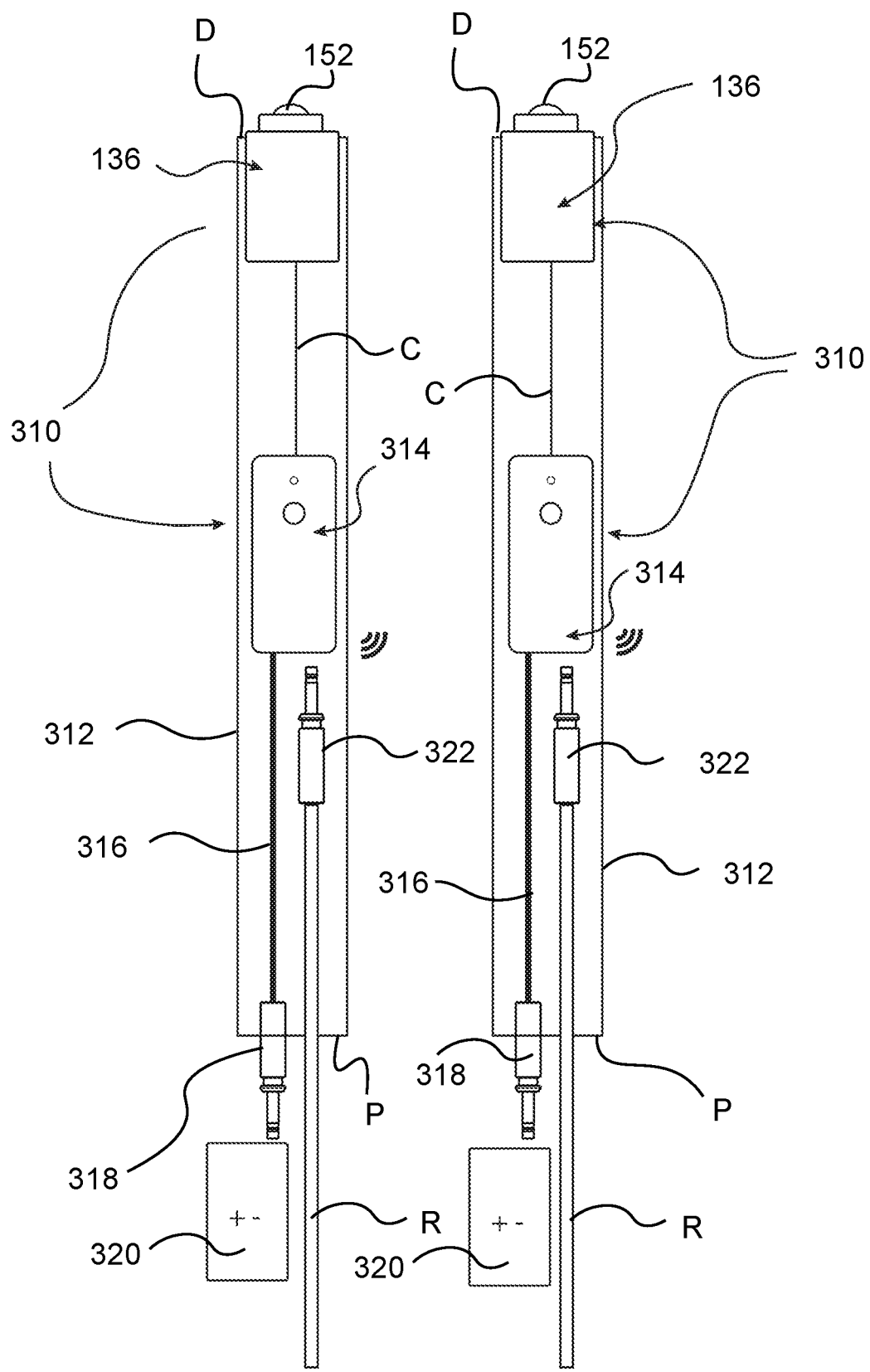

FIG. 14 shows two control devices 310, one integrated into each of two handlebar parts, which again may be time trial bar extensions 312, of a bicycle. In this example, each control device 310 has a control element 314 with electronics only, an actuator 136 at a distal end D of the bar extension 312, and an auxiliary port or jack (not shown) on the control element 314. The control element 314 is disposed at the transition portion of the bar extension 312. In this example, a cable C for each actuator 136 is hardwired to the control element 314. A power line 316 is hardwired to the control element and extends through the proximal end P of the bar extension 312, terminating at a male connector 318. A remote or external battery or power supply 320 is provide elsewhere on a bicycle and has a port or jack (not shown) for the connector 318 to provide power for the control device 310. An auxiliary cable R from a remote actuator (not shown, such as an actuator 228 on a base bar or pursuit bar) has a male connector 322 that can be inserted into the auxiliary port or jack on the control element 314. In this example, the auxiliary cable R and connector 322 can be disconnected from the control element 314 and withdrawn from the bar extension 312, which can then be cut to a desired length before being mounted, assembled, or installed on a bicycle.

Figure 15:
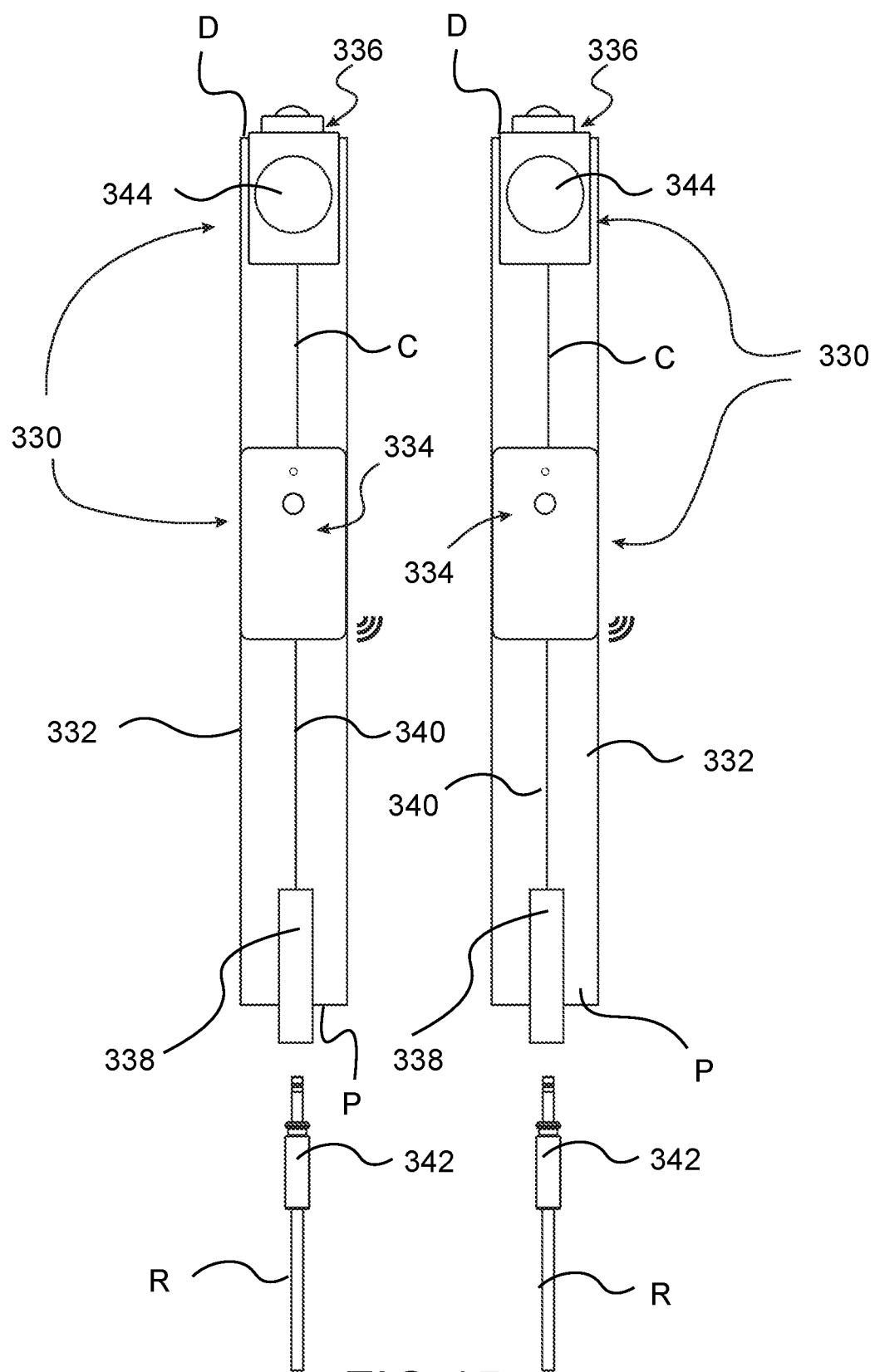

FIG. 15 shows two control devices 330, one integrated into each of two handlebar parts, which may be time trial bar extensions 332, of a bicycle. In this example, each control device 330 has a control element 334 with electronics only, an actuator 336 at a distal end D of the bar extension 332, and an auxiliary jack 338 exposed at a proximal end P of the bar extension. The control element 334 is disposed at the transition portion of the bar extension 332. In this example, a cable C for each actuator 336 is hardwired to the control element 334. Likewise, an auxiliary line 340 is connected to the auxiliary jack 338 and is hardwired to the control element 334. An auxiliary cable R from a remote actuator (not shown, such as an actuator 228 on a base bar or pursuit bar) has a male connector 342 that can be inserted into the auxiliary jack 338. The actuator 336 in this example carries a battery or power supply 344 instead of the power source being part of the control element. Also, in this example, the auxiliary line 340 and jack 338 can be pushed into the proximal end P of the bar extension 332, which can then be cut to a desired length before being mounted, assembled, or installed on a bicycle.

In any of the foregoing examples, the antenna of the control device is provided on the control element. In each example, the control element can be configured and oriented, when installed, to place the antenna at a furthest distance from the gripping part of the bar extension or other handlebar part. This can aid in minimizing any interference that might be caused by a rider's hand gripping the gripping part.

Figure 16:
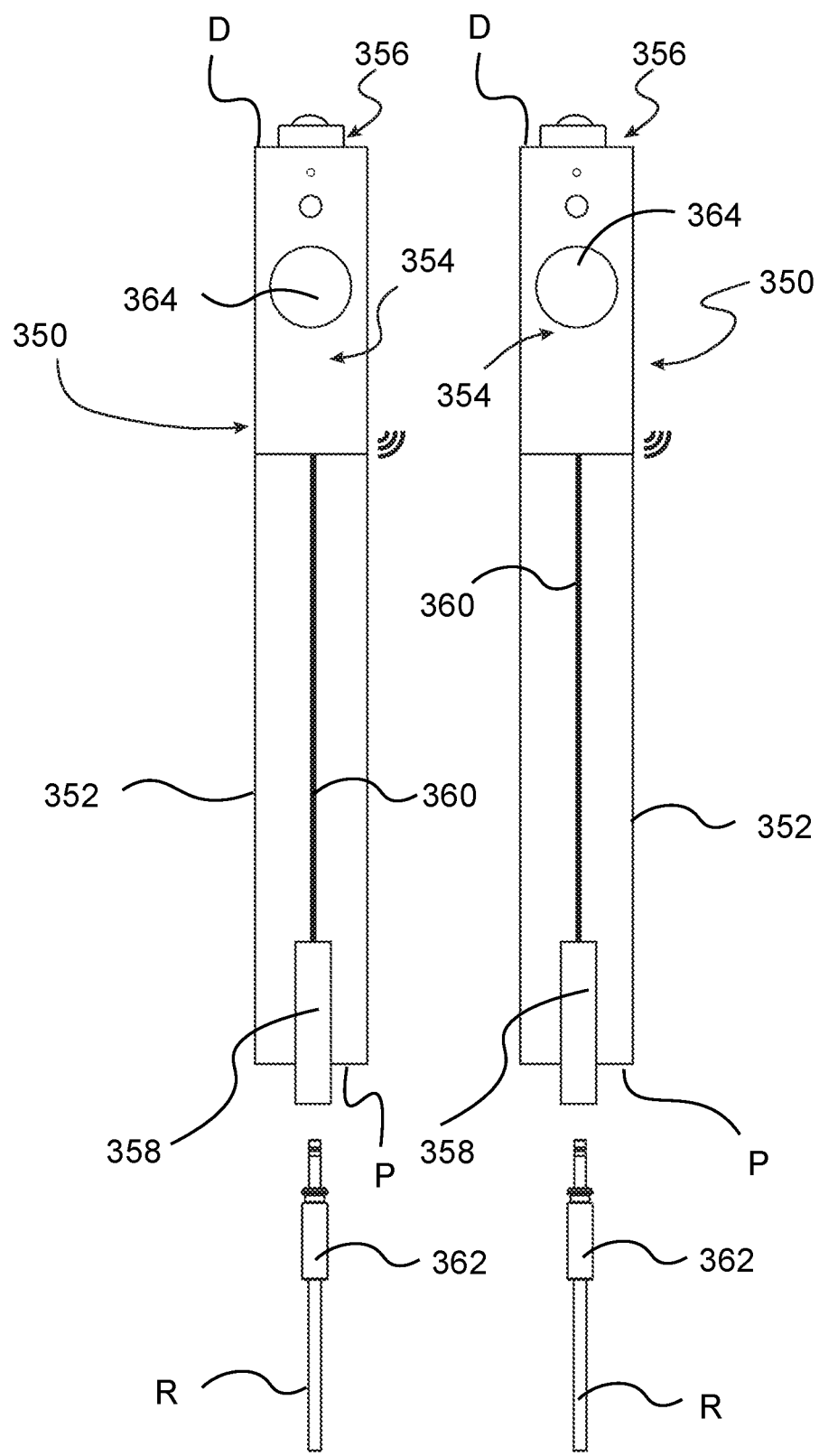

FIG. 16 shows two control devices 350, one integrated into each of two handlebar parts, which may be time trial bar extensions 352, of a bicycle. In this example, each control device 350 has a control element 354, an actuator 356 integrated as a part of the control element and disposed at a distal end D of the bar extension 352, and an auxiliary jack 358 exposed at a proximal end P of the bar extension. In this example, the entire control element 354 and actuator 356 is fitted into the distal end D of the bar extension 352. An auxiliary line 360 is connected to the auxiliary jack 358 and is hardwired to the control element 354. An auxiliary cable R from a remote actuator (not shown, such as an actuator 228 on a base bar or pursuit bar) has a male connector 362 that can be inserted into the auxiliary jack 358. The control element 354 in this example carries a battery or power supply 364 and the actuator 356. The antenna in this example, depicted by the signal icon in this and other figures herein, can be positioned on the control element 354 furthest from the distal end D to minimize any interference caused by a rider's hand gripping the gripping portion of the bar extension 352. In this example, the auxiliary line 360 and jack 358 can be pushed into the proximal end P of the bar extension 352, which can then be cut to a desired length before being mounted, assembled, or installed on a bicycle.

Figure 17:
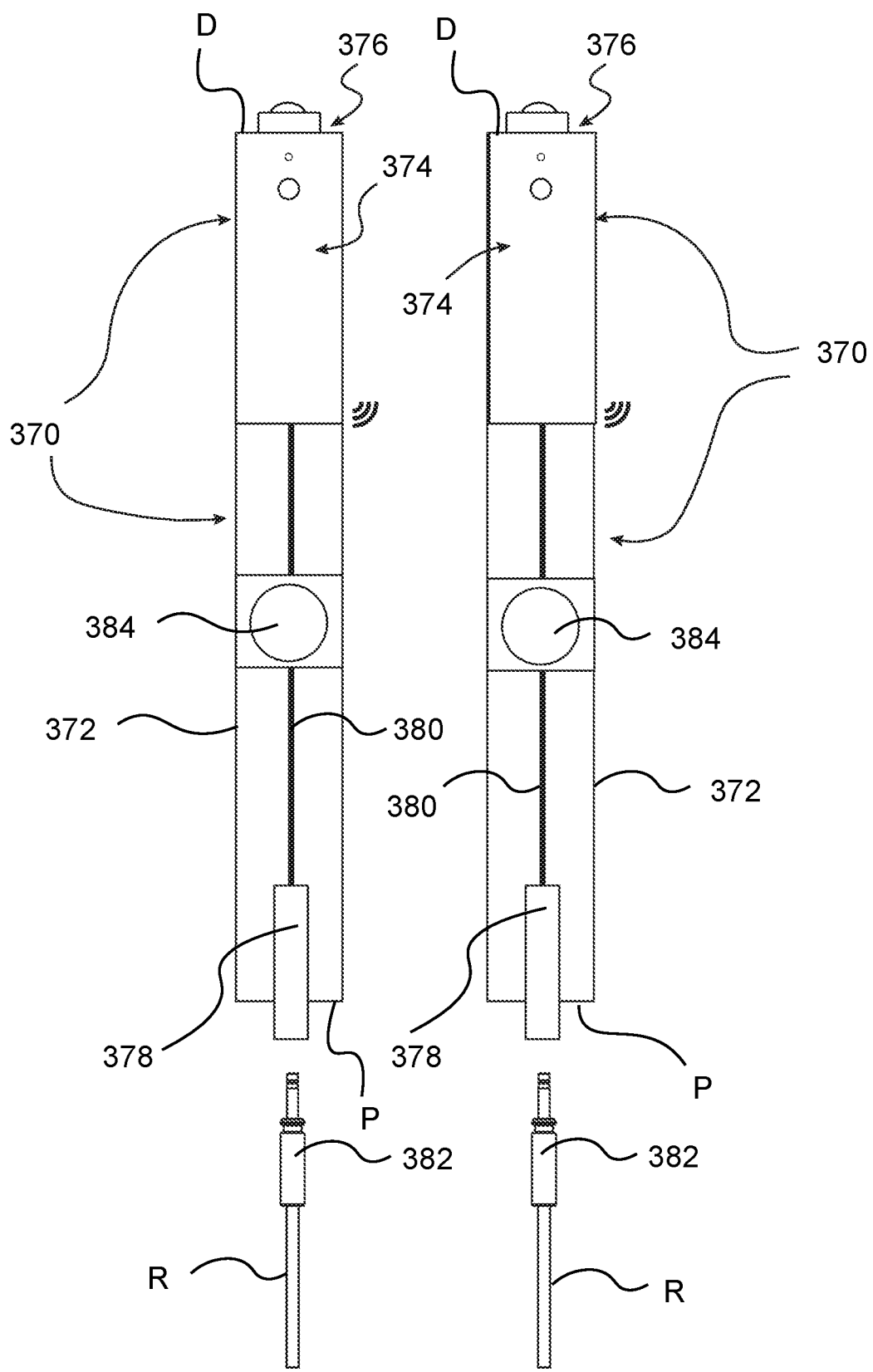

FIG. 17 shows two control devices 370, one integrated into each of two handlebar parts, which may be time trial bar extensions 372, of a bicycle. In this example, each control device 370 has a control element 374 with electronics only, an actuator 376 integrated as a part of the control element and disposed at a distal end D of the bar extension 372, and an auxiliary jack 378 exposed at a proximal end P of the bar extension. In this example, the control element 374 and actuator 376 is fitted into the distal end D of the bar extension 372. An auxiliary line 380 is connected to the auxiliary jack 378 and is hardwired to the control element 374. An auxiliary cable R from a remote actuator (not shown, such as an actuator 228 on a base bar or pursuit bar) has a male connector 382 that can be inserted into the auxiliary jack 378. A battery or power supply 384 is separate from the control element 374 in this example and is positioned in the transition portion of the bar extension 372. The antenna in this example can again be positioned on the control element 374 furthest from the distal end D to minimize any interference caused by a rider's hand gripping the gripping portion of the bar extension 372. In this example, the auxiliary line 380 and jack 378 can be pushed into the proximal end P of the bar extension 372, which can then be cut to a desired length before being mounted, assembled, or installed on a bicycle.

Figure 18:
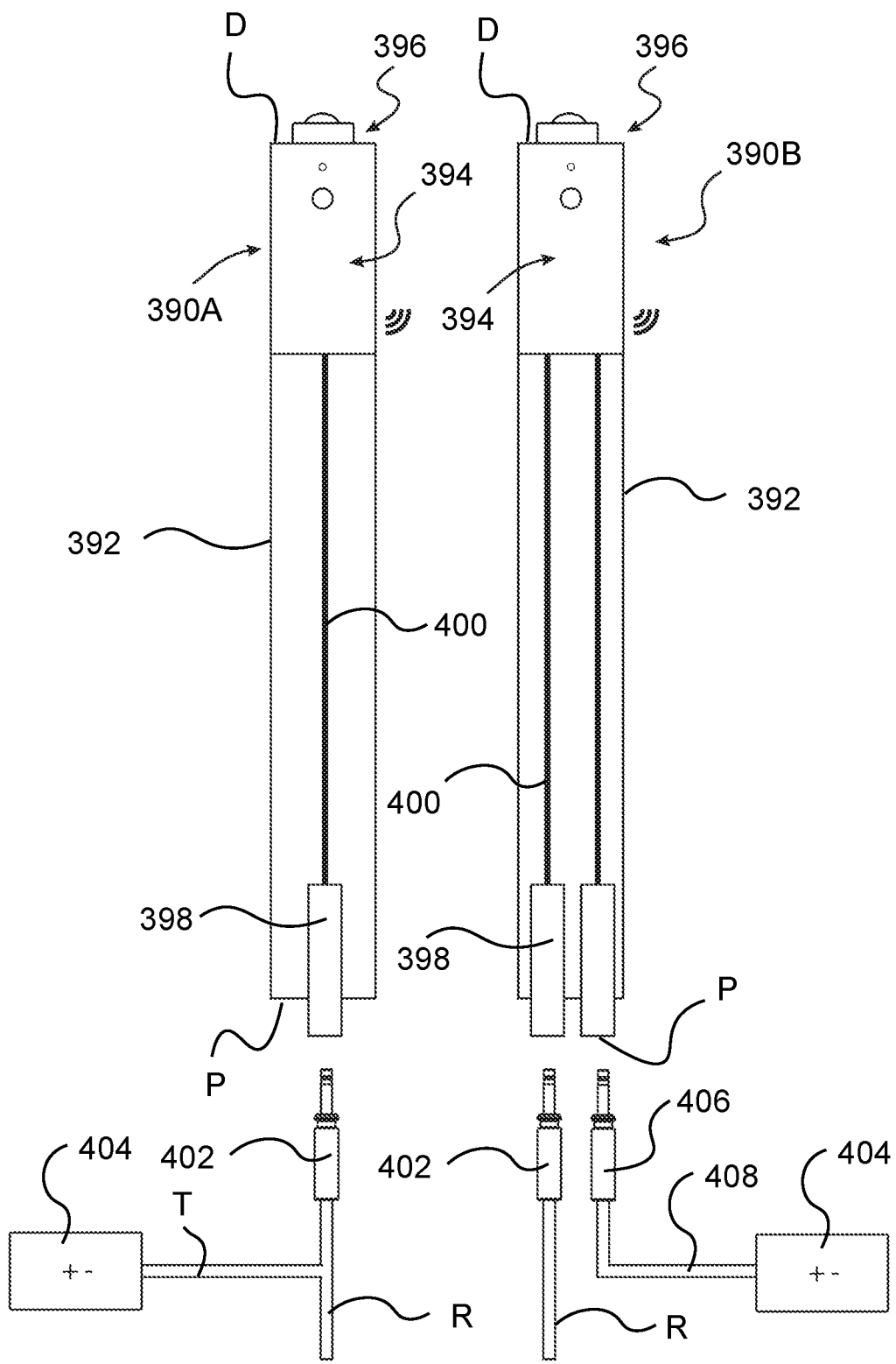

FIG. 18 shows two control devices 390A, 390B, one integrated into each of two handlebar parts, which may be time trial bar extensions 392, of a bicycle. As noted above and as illustrated by this example, one bicycle may have two integrated bicycle control devices that are not identical to one another. In this example, each control device 390A, 390B has a control element 394 with electronics only, an actuator 396 integrated as a part of the control element and disposed at a distal end D of the bar extension 392, and an auxiliary jack 398 exposed at a proximal end P of the bar extension. In this example, the control element 394 and actuator 396 is fitted into the distal end D of the bar extension 392. An auxiliary line 400 is connected to the auxiliary jack 398 and is hardwired to the control element 394. An auxiliary cable R from a remote actuator (not shown, such as an actuator 228 on a base bar or pursuit bar) has a male connector 402 that can be inserted into the auxiliary jack 398.

Each of the control devices 390A, 390B has a remote or external power source 404 that is positioned elsewhere on the bicycle. The antenna in this example can again be positioned on the control element 394 furthest from the distal end D to minimize any interference caused by a rider's hand gripping the gripping portion of the bar extension 372. In this example, the auxiliary line 400 and jack 398 can be pushed into the proximal end P of the bar extension 392, which can then be cut to a desired length before being mounted, assembled, or installed on a bicycle.

For the control device 390A, the external power source 404 is connected at a T junction to the auxiliary cable R. Thus, the auxiliary cable R will be connected to the auxiliary jack 398 to provide power for the control device 390A, regardless as to whether a remote actuator or other component is connected to the cable R. For the control device 390B, the external power source is connected to a separate jack 406, which is hardwired by an auxiliary line 408 to the control element.

Figure 19:
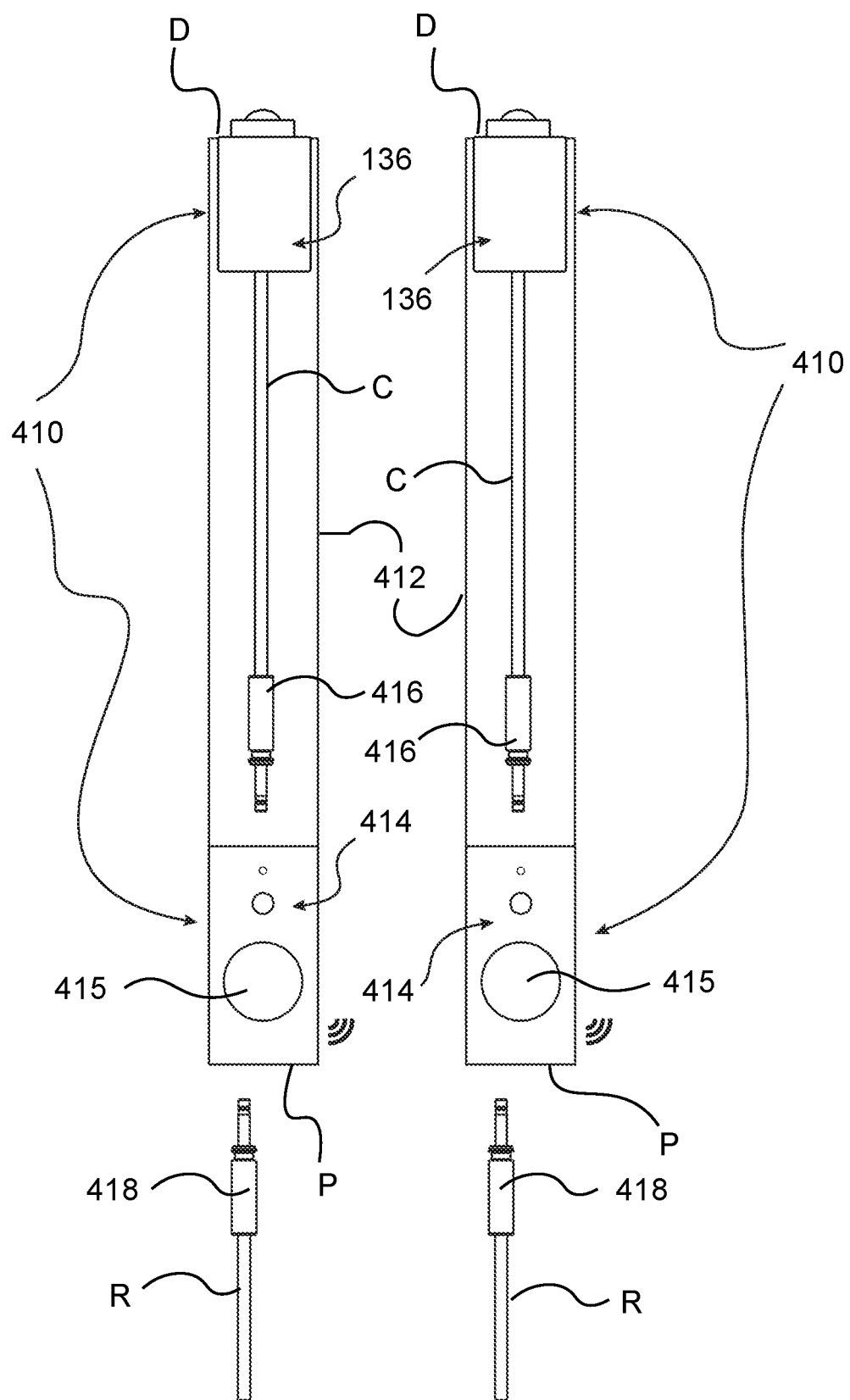

FIG. 19 shows two control devices 410, one integrated into each of two handlebar parts, which may be time trial bar extensions 412, of a bicycle. In this example, each control device 410 has a control element 414 with a power source 415, an actuator 136 at a distal end D of the bar extension 412, a first port or jack (not shown) on the control element for connecting the actuator, and an auxiliary port or jack (not shown) on the control element. In this example, the control element 414 is disposed at the proximal end P of the bar extension 412. In this example, a cable C for each actuator 136 has a male connector 416 for connecting the cable and actuator 136 to the first port or jack on the control element 414. Likewise, an auxiliary an auxiliary cable R from a remote actuator (not shown, such as an actuator 228 on a base bar or pursuit bar) has a male connector 418 that can be inserted into the auxiliary port or jack on the control element 414. In this example, the control element 414 should be removable from the proximal end P of the bar extension 412 in order to then cut the bar extension to a desired length before being mounted, assembled, or installed on a bicycle.

Figure 20:
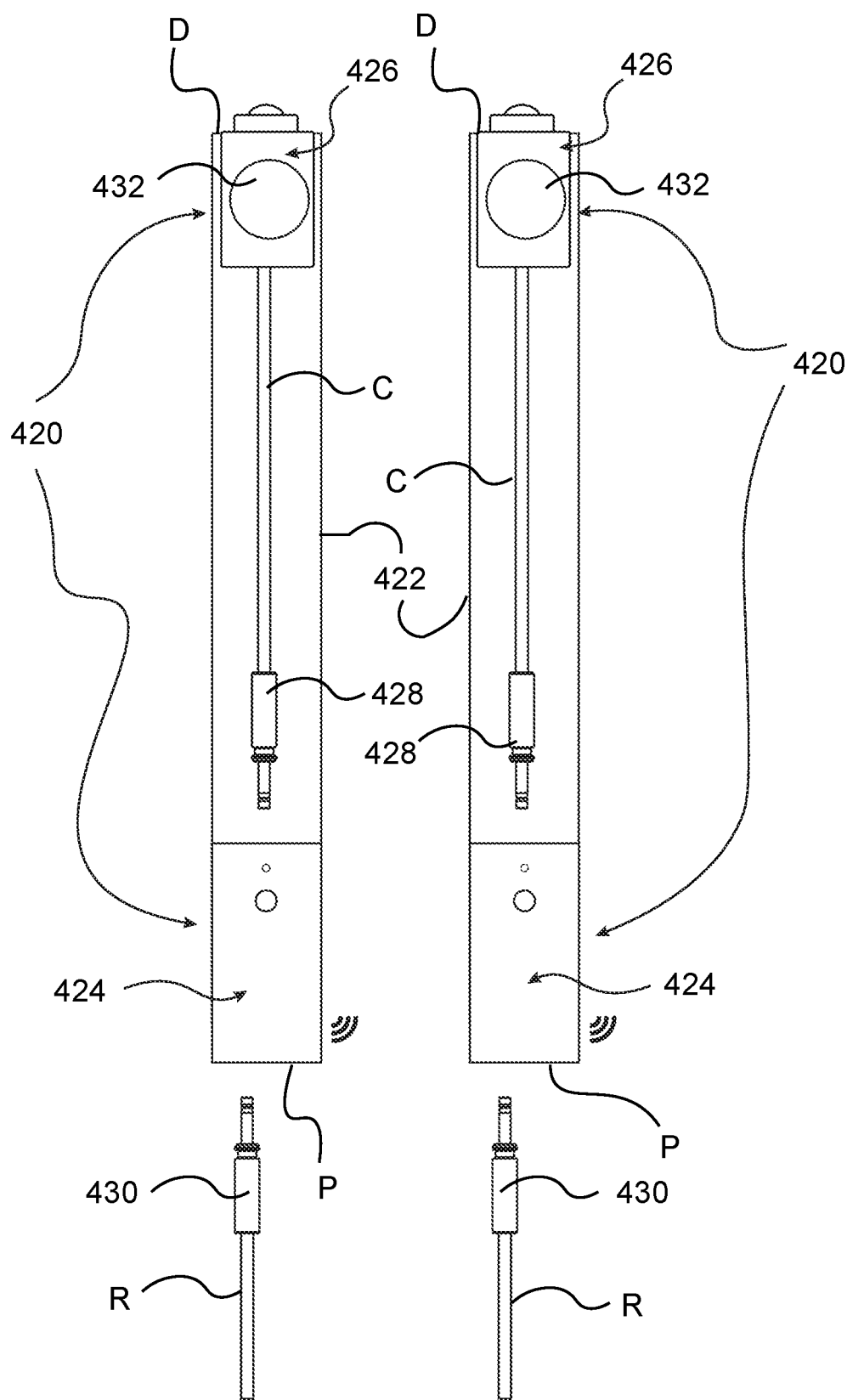

FIG. 20 shows two control devices 420, one integrated into each of two handlebar parts, which may be time trial bar extensions 422, of a bicycle. In this example, each control device 420 has a control element 424 with electronics only, an actuator 426 at a distal end D of the bar extension 422, a first port or jack (not shown) on the control element for connecting the actuator, and an auxiliary port or jack (not shown) on the control element. In this example, the control element 424 is disposed at the proximal end P of the bar extension 422. In this example, a cable C for each actuator 426 has a male connector 428 for connecting the cable and actuator 426 to the first port or jack on the control element 424. Likewise, an auxiliary an auxiliary cable R from a remote actuator (not shown, such as an actuator 228 on a base bar or pursuit bar) has a male connector 430 that can be inserted into the auxiliary port or jack on the control element 424. The actuator 426 in this example carries a battery or power supply 432 instead of the power source being part of the control element. In this example, the control element 424 should be removable from the proximal end P of the bar extension 422 in order to then cut the bar extension to a desired length before being mounted, assembled, or installed on a bicycle.

Figure 21:
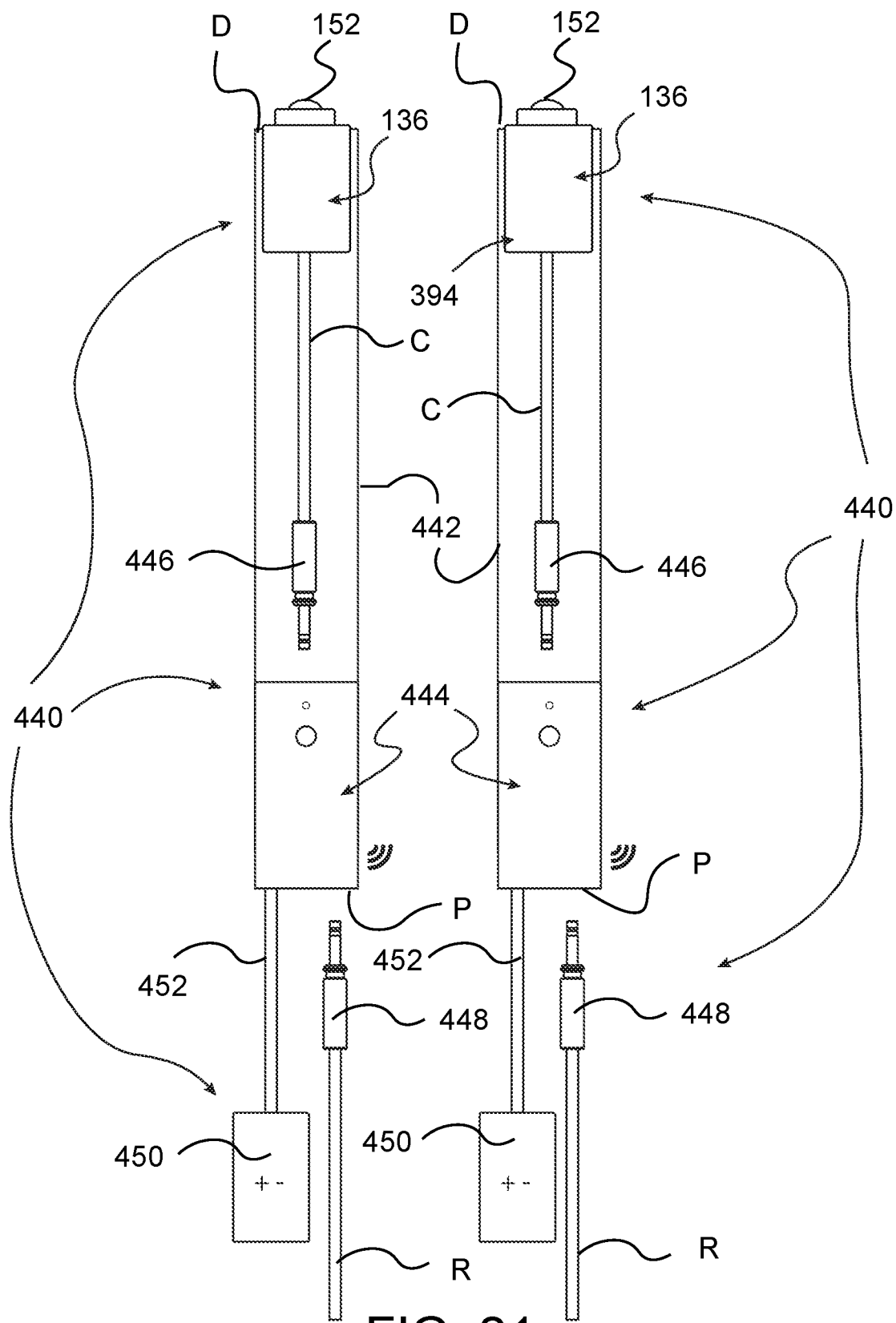
Figure 22:
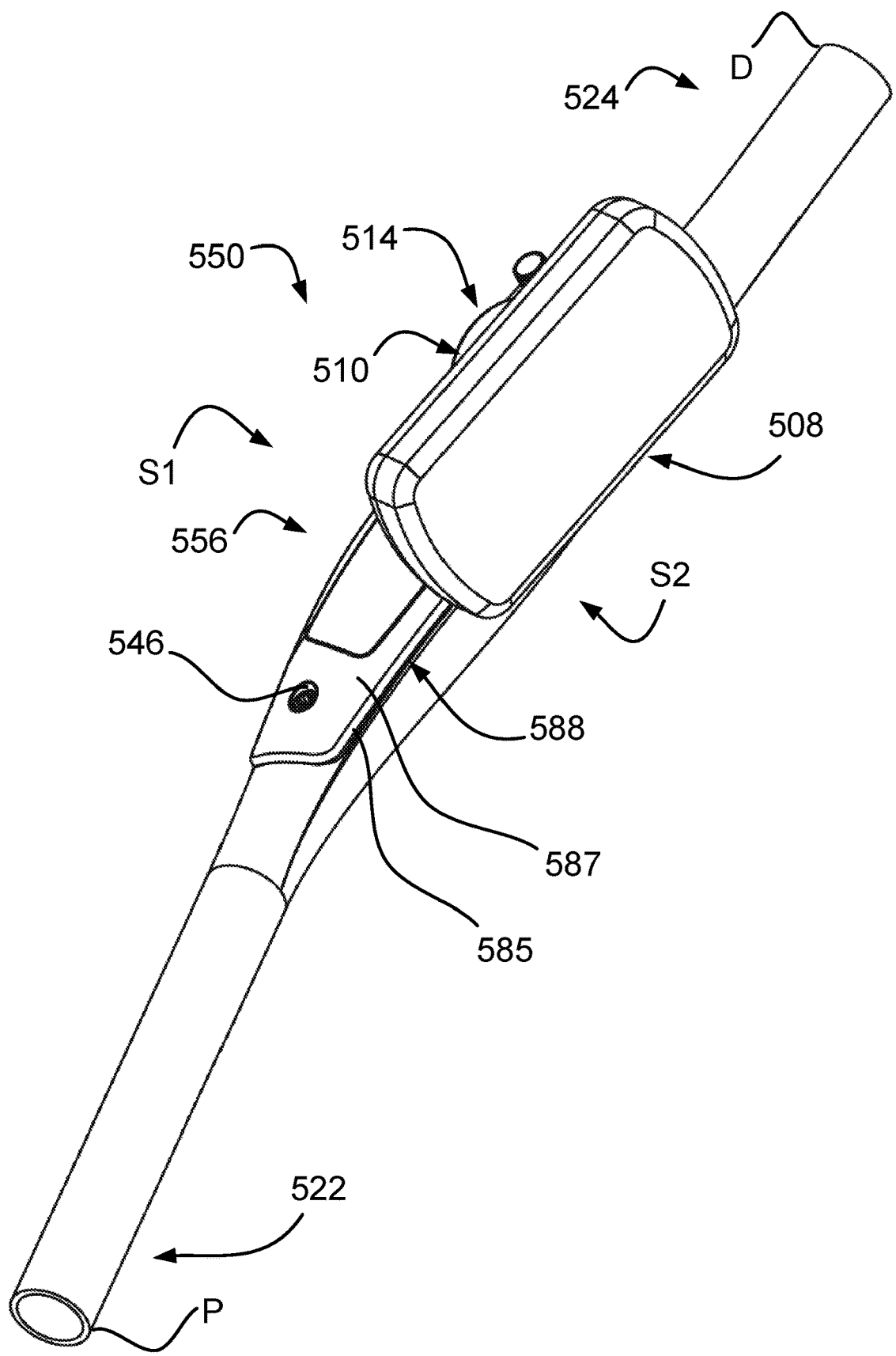
FIGS. 22-29 show various views of an alternative example of handlebar extensions and integrated bicycle control devices and arrangements according to the present disclosure.
Figure 23:
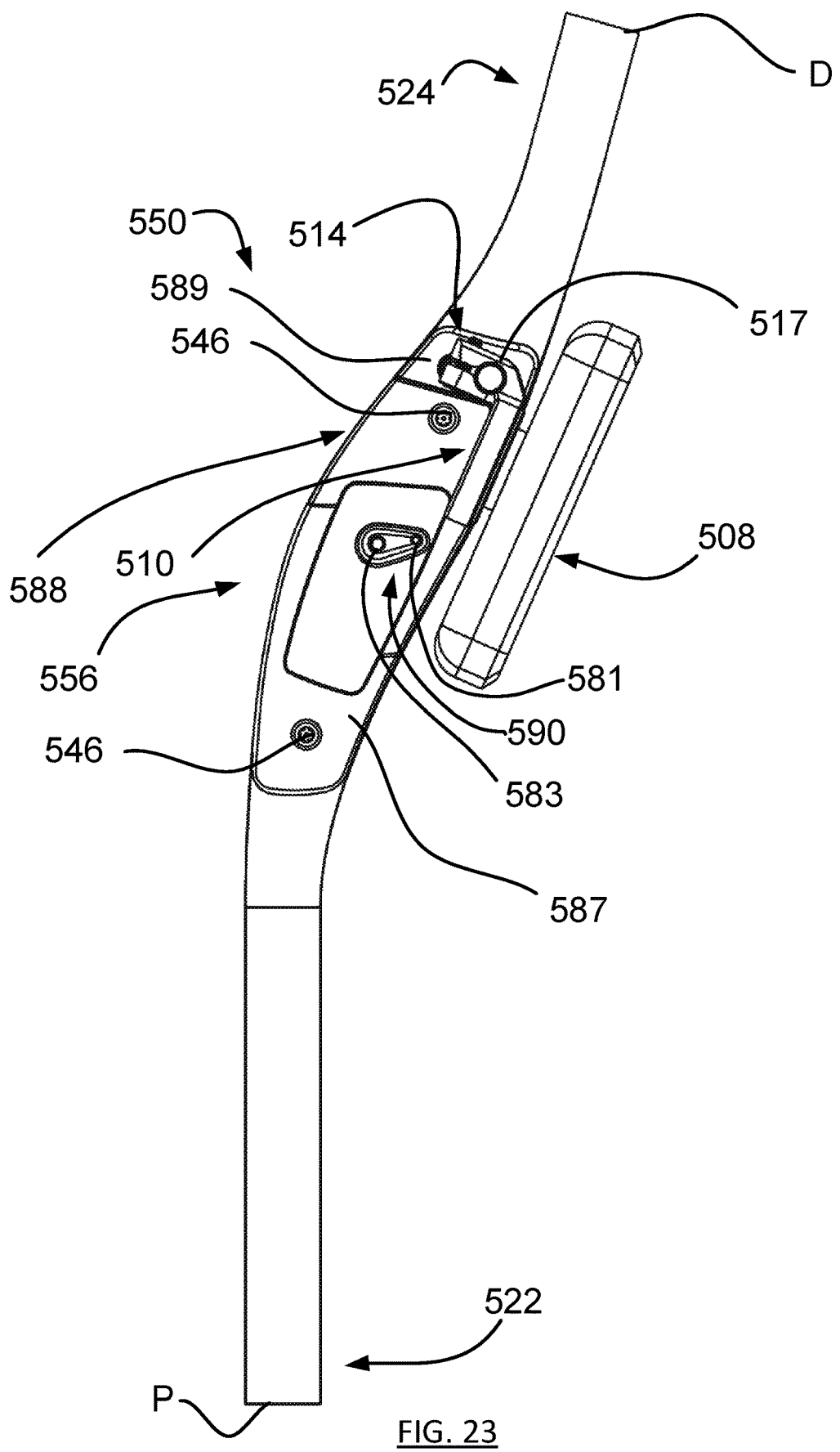

FIG. 21 shows two control devices 440, one integrated into each of two handlebar parts, which may be time trial bar extensions 442, of a bicycle. In this example, each control device 440 has a control element 444 with electronics only, an actuator 136 at a distal end D of the bar extension 442, a first port or jack (not shown) on the control element for connecting the actuator, and an auxiliary port or jack (not shown) on the control element. In this example, the control element 444 is disposed at the proximal end P of the bar extension 442. In this example, a cable C for each actuator 136 has a male connector 446 for connecting the cable and actuator 136 to the first port or jack on the control element 444. Likewise, an auxiliary an auxiliary cable R from a remote actuator (not shown, such as an actuator 228 on a base bar or pursuit bar) has a male connector 448 that can be inserted into the auxiliary port or jack on the control element 444. A remote or external battery or power supply 450 is hardwired via a power line 452 to the control element 444 instead of the power source being part of the control element. In this example, the control element 444 should be removable from the proximal end P of the bar extension 442 in order to then cut the bar extension to a desired length before being mounted, assembled, or installed on a bicycle.

Numerous examples of integrated bicycle control devices are disclosed and described herein. In each example, the control element or other control device components can be secured or otherwise fastened directly in the corresponding compartment within the handlebar part, i.e., the primary mounting structure. Alternatively, the compartment can be shaped to closely follow the shape of the control element or other control device component so that the component can be generally held in place within the compartment. In another example, the control element or other components, including such components having no separate distinct housing or case, may be loosely held in the corresponding compartment within the handlebar part. In another alternative, one or more secondary mounting structures may be utilized within the handlebar part or primary mounting structure to secure the control element or other control device components in place.

The structure and function of the handlebar part can vary from the disclosed time trial type bar extensions. The material from which such handlebar parts are fabricated can also vary. The parts can be made from carbon fiber material, aluminum, or the like. The primary mounting structure of the disclosed control devices may extend into the mounting portion of the handlebar part. The secondary mounting structures of the disclosed control devices may have a mating surface formed of the same material as primary mounting structure and/or may be designed to mate with the primary mounting structure, the housing or case of the control element, the housing of other components, and/or one or more of the components of the control device.

The secondary mounting structures may be disposed within the primary mounting structure at or adjacent to the gripping portion. In one example, the secondary mounting structure may include a lugged aluminum mounting structure. The secondary mounting structure may be co-formed within the primary mounting structure and may extend axially from gripping portion. The secondary mounting material structure may be disposed within the primary mounting structure near the transition portion.

The power supply, i.e., the power supply or battery, may be disposed in the gripping portion, may be contained within a housing, and/or may be mounted to or with at least one mounting structure. The power supply may be included in the same housing as the wireless communication module or may be disposed in a separate housing from the wireless communication module. The power supply may be disposed in the transition portion of the handlebar part, contained within a housing, and mounted to at least one of the mounting structures. The power supply can instead be disposed in the mounting portion and be mounted to a mounting structure within the handlebar part. The power supply may be an external power supply, positioned remote from the handlebar part and control device electronics.

The wireless communication module may be disposed in the gripping portion, contained within a housing, and mounted to or with at least one of the aforementioned mounting structures. The wireless communication module may be in the same housing as the power supply or may be disposed in a housing separate from the power supply. The wireless communication module may be disposed in the transition portion, contained within a housing, and mounted to or with at least one of the aforementioned mounting structures. The wireless communication module may be disposed in the mounting portion and mounted using the primary mounting structure.

The switch or switches may be disposed in the gripping portion and mounted to or with at least one of the aforementioned mounting structures. The switch or switches may be disposed in the same housing as the wireless communication module, the same housing as the power supply, or both. The switch may be mounted in the gripping portion of the primary mounting structure in electric communication with the wireless communication module and/or power supply.

The auxiliary port or jack connection may be or include an electrical input that is flexible and extends through the bicycle control device. The auxiliary port or jack may extend at least partially beyond the end of the mounting portion and may provide electrical input to the wireless communication module located in either the transition portion or the gripping portion.

The LED can be arranged within or on the bicycle control device to provide visible or visual input to the bicycle rider. The LED can be disposed or arranged in the gripping portion or the transition portion. The LED may be disposed in the gripping portion above a center axis of the gripping portion and within the housing of the wireless communication module.

The grip cover covers the gripping portion and may extend onto the transition portion. In one example, the grip cover may be about 100 to 150 mm in length. The grip cover can be made from a flexible material and shaped for ergonomic gripping by a rider. The grip cover may have interlocking features with either or both of the primary or secondary mounting structures to aid in retaining the grip cover in position on the handlebar part. The grip cover may contain cutouts or design features, such as shapes, textures, colors, and/or the like to allow for access to or indication of where a switch is located on the bicycle.

In an embodiment, a handlebar part of a bicycle handlebar assembly is provided. The handlebar part may include a body having a gripping portion and a transition portion spaced from the gripping portion, a compartment formed in the transition portion, and/or a control device integrated into the body. The control device may include an actuator coupled to the handlebar part adjacent the gripping portion and a control element received within the compartment. The control element may include a controller configured to generate a signal in response to actuation of the actuator, and a communication module configured to transmit the signal.

The handlebar part of the embodiment may also include an LED in the control element. The LED may be visible from outside the handlebar part. The handlebar part may be formed as a bar extension configured to be connected to a handlebar assembly. In an example, the body has a mounting portion adjacent a proximal end of the body and the transition portion disposed between the mounting portion and the gripping portion.

In an example, the handlebar part may also include an opening to the compartment on a top and/or a side of the body.

In another example, the gripping portion is adjacent a distal end of the body.

In an embodiment, the handlebar part also includes an antenna in communication with the controller, and/or a power supply for providing power to the controller and the communication module. In an example, the antenna and/or the power supply is provided as a part of the control element.

In this, or another embodiment, the control device also includes an opening in the body to permit access to the compartment, and a removable cover attachable to the body to cover the opening and close the compartment.

In an embodiment, an integrated bicycle control device is provided. The control device may include a handlebar part of a bicycle handlebar assembly. The handlebar part may have a body with a gripping portion adjacent a distal end of the body, a mounting portion adjacent a proximal end of the body, and a transition portion spaced from and disposed between the gripping portion and the mounting portion. The handlebar part may also include a compartment formed in the body and an opening in the body to permit access to the compartment. An actuator may be disposed at or near the distal end of the body. A control element may be received in the compartment. The control element may include a housing and a controller in the housing configured to generate a signal in response to actuation of the actuator. The bicycle control may also include an antenna in communication with the controller, wherein the antenna is positioned along the body spaced from the distal end and the gripping portion. The actuator may be connected to the control element.

In an embodiment, the antenna is disposed along the transition portion of the body.

In an embodiment, the compartment is in the transition portion.

In an embodiment the antenna is in the housing of the control element.

Although certain integrated bicycle control devices, features, aspects, parts, components, and characteristics have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A handlebar part of a bicycle handlebar assembly, the handlebar part comprising:
 a body having a gripping portion and a transition portion spaced from the gripping portion;
 a compartment formed in the transition portion; and
 a control device integrated into the body, the control device having
  an actuator coupled to the handlebar part adjacent the gripping portion,
  a control element received within the compartment, the control element including
  a controller configured to generate a signal in response to actuation of the actuator, and a communication module configured to transmit the signal.

2. The handlebar part of claim 1, further comprising:
a LED in the control element, the LED visible from outside the handlebar part.

3. The handlebar part of claim 1, wherein the handlebar part is a bar extension configured to be connected to a handlebar assembly.

4. The handlebar part of claim 2, wherein the body has a mounting portion adjacent a proximal end of the body, the transition portion disposed between the mounting portion and the gripping portion.

5. The handlebar part of claim 1, further comprising:
an opening to the compartment on a top of the body.

6. The handlebar part of claim 1, further comprising:
an opening to the compartment on a side of the body.

7. The handlebar part of claim 1, wherein the gripping portion is adjacent a distal end of the body.

8. The handlebar part of claim 1, further comprising:
an antenna in communication with the controller, and
a power supply for providing power to the controller and the communication module.

9. The handlebar part of claim 8, wherein the antenna is provided as a part of the control element.

10. The handlebar part of claim 8, wherein the power supply is provided as a part of the control element.

11. The handlebar part of claim 1, wherein the control device further comprises:
an opening in the body to permit access to the compartment; and
a removable cover attachable to the body to cover the opening and close the compartment.

12. An integrated bicycle control device comprising:
a handlebar part of a bicycle handlebar assembly, the handlebar part having a body with a gripping portion adjacent a distal end of the body, a mounting portion adjacent a proximal end of the body, and a transition portion spaced from and disposed between the gripping portion and the mounting portion;
a compartment formed in the body;
an opening in the body to permit access to the compartment;
an actuator disposed at or near the distal end of the body;
a control element received in the compartment, the control element including a housing and a controller in the housing configured to generate a signal in response to actuation of the actuator; and
an antenna in communication with the controller,
wherein the antenna is positioned along the body spaced from the distal end and the gripping portion, and
wherein the actuator is connected to the control element.

13. The integrated bicycle control device of claim 12, wherein the antenna is disposed along the transition portion of the body.

14. The integrated bicycle control device of claim 12, wherein the compartment is in the transition portion.

15. The integrated bicycle control device of claim 12, wherein the antenna is in the housing of the control element.

* * * * *